US012644422B2

(12) United States Patent
Smith et al.

(10) Patent No.: US 12,644,422 B2
(45) Date of Patent: Jun. 2, 2026

(54) MULTI-FUEL, FUEL INJECTION SYSTEM FOR A TURBINE ENGINE

(71) Applicant: RTX Corporation, Farmington, CT (US)

(72) Inventors: Lance L. Smith, West Hartford, CT (US); Timothy S. Snyder, Glastonbury, CT (US); Jeffrey M. Cohen, Hebron, CT (US); Peter Cocks, South Glastonbury, CT (US); Sean C. Emerson, Broad Brook, CT (US)

(73) Assignee: RTX Corporation, Farmington, CT (US)

( * ) Notice: Subject to any disclaimer, the term of this patent is extended or adjusted under 35 U.S.C. 154(b) by 59 days.

(21) Appl. No.: 18/594,771

(22) Filed: Mar. 4, 2024

(65) Prior Publication Data

US 2025/0223930 A1     Jul. 10, 2025

Related U.S. Application Data

(63) Continuation of application No. 17/231,742, filed on Apr. 15, 2021, now Pat. No. 11,920,524.

(51) Int. Cl.
*F02C 9/40*        (2006.01)
*F02C 7/22*        (2006.01)

(52) U.S. Cl.
CPC . *F02C 9/40* (2013.01); *F02C 7/22* (2013.01)

(58) Field of Classification Search
CPC .................................... F02C 7/22; F02C 9/40
See application file for complete search history.

(56) References Cited

U.S. PATENT DOCUMENTS

| | | | |
|---|---|---|---|
| 2,647,368 A | 8/1953 | Heinrich | |
| 3,049,872 A | 8/1962 | Johnson | |
| 3,313,103 A | 4/1967 | Johnson | |
| 3,838,553 A * | 10/1974 | Doherty | C01B 3/506 95/143 |
| 5,122,033 A | 6/1992 | Paul | |
| 6,874,323 B2 | 4/2005 | Stuttaford | |
| 7,966,830 B2 | 6/2011 | Daggett | |
| 8,333,075 B2 | 12/2012 | York | |

(Continued)

FOREIGN PATENT DOCUMENTS

| | | |
|---|---|---|
| CN | 104832219 B | 1/2017 |
| JP | 2017180303 A | 10/2017 |
| JP | 2019015179 A | 1/2019 |

OTHER PUBLICATIONS

"Liquid Hydrogen as a Propulsion Fuel, 1945-1959", https://history.nasa.gov/SP-4404/ch8-3.htm.

*Primary Examiner* — Lorne E Meade
(74) *Attorney, Agent, or Firm* — Getz Balich LLC

(57)        ABSTRACT

An assembly is provided for a turbine engine with a flowpath. This turbine engine assembly includes a fuel injection system. The fuel injection system includes a first fuel injector and a second fuel injector. The fuel injection system is configured to provide the first fuel injector with first fuel and provide the second fuel injector with second fuel. The first fuel may be or include ammonia. The second fuel is different than the first fuel. The second fuel may be or include hydrogen gas. The first fuel injector is configured to direct the first fuel into the flowpath for combustion. The second fuel injector is configured to direct the second fuel into the flowpath for combustion.

12 Claims, 12 Drawing Sheets

(56)  References Cited

U.S. PATENT DOCUMENTS

| 8,430,360 B2 | 4/2013 | Schwarze |
| 9,383,107 B2 | 7/2016 | Shershnyov |
| 10,753,276 B2 | 8/2020 | Bulat |
| 10,767,855 B2 | 9/2020 | Bulat |
| 11,084,719 B2 | 8/2021 | Andersen |
| 2018/0180289 A1 | 6/2018 | Lavertu, Jr. |
| 2018/0355794 A1* | 12/2018 | Bulat ........................ F02C 3/28 |
| 2019/0084831 A1 | 3/2019 | Andersen |
| 2020/0018482 A1 | 1/2020 | Ito |
| 2020/0032712 A1 | 1/2020 | Ito |

* cited by examiner

MULTI-FUEL, FUEL INJECTION SYSTEM FOR A TURBINE ENGINE

This application is a continuation of U.S. patent application Ser. No. 17/231,742 filed Apr. 15, 2021, which is hereby incorporated herein by reference in its entirety.

BACKGROUND OF THE DISCLOSURE

1. Technical Field

This disclosure relates generally to a turbine engine and, more particularly, to a fuel system for the turbine engine.

2. Background Information

As government emissions standards tighten, interest in alternative fuels for gas turbine engines continues to grow. For example, ammonia may be used to fuel a gas turbine engine rather than a more traditional hydrocarbon fuel such as kerosene. However, compared to a traditional hydrocarbon fuel, ammonia fuel has narrower flammability limits and slower flame speeds. Ammonia fuel is therefore more difficult to combust/burn than traditional hydrocarbon fuels, particularly where the gas turbine engine is operating at a relatively low power setting such as during initial ignition/startup.

SUMMARY OF THE DISCLOSURE

According to an aspect of the present disclosure, an assembly is provided for a turbine engine with a flowpath. This turbine engine assembly includes a fuel injection system. The fuel injection system includes a first fuel injector and a second fuel injector. The fuel injection system is configured to provide the first fuel injector with first fuel. The fuel injection system is configured to provide the second fuel injector with second fuel. The first fuel is or includes ammonia. The second fuel is different than the first fuel. The second fuel is or includes hydrogen gas. The first fuel injector is configured to direct the first fuel into the flowpath for combustion. The second fuel injector is configured to direct the second fuel into the flowpath for combustion.

According to another aspect of the present disclosure, another assembly is provided for a turbine engine with a flowpath. This turbine engine assembly includes a fuel injection system. The fuel injection system includes a fuel source, a first fuel injector and a second fuel injector. The fuel injection system is configured to process supply fuel output from the fuel source to provide first fuel and second fuel. The second fuel has a different composition than the first fuel. The first fuel injector is configured to inject the first fuel into the flowpath for combustion. The second fuel injector is configured to inject the second fuel into the flowpath for combustion.

According to another aspect of the present disclosure, another assembly is provided for a turbine engine. This turbine engine assembly includes a combustor and a fuel injection system. The combustor includes a combustion chamber. The fuel injection system is configured to inject non-hydrocarbon fuel into a volume upstream of the combustion chamber for subsequent combustion within the combustion chamber.

According to still another aspect of the present disclosure, a method is provided for operating a turbine engine with a flowpath. During this method, ammonia is processed with a fuel injection system to provide first fuel and second fuel.

The first fuel includes at least the ammonia. The second fuel includes at least hydrogen gas extracted from the ammonia. The first fuel is directed into the flowpath and the second fuel is separately directed into the flowpath. The first fuel and the second fuel are combusted within the flowpath.

The first fuel injector may be configured to direct a first mass flow of the first fuel into the flowpath. The second fuel injector may be configured to direct a second mass flow of the second fuel into the flowpath. The second mass flow of the second fuel may be different (e.g., less) than the first mass flow of the first fuel.

The first fuel injector maybe configured to direct the first fuel into the flowpath for combustion when the turbine engine is in a first mode of operation. The second fuel injector may be configured to direct the second fuel into the flowpath for combustion when the turbine engine is in a second mode of operation.

The first fuel injector may not direct the first fuel into the flowpath when the turbine engine is in the second mode of operation.

The second fuel injector may be configured to direct the second fuel into the flowpath for combustion when the turbine engine is in the first mode of operation.

The second fuel injector may not direct the second fuel into the flowpath when the turbine engine is in the first mode of operation.

At least a majority of the first fuel may be the ammonia. In addition or alternatively, at least a majority of the second fuel may be the hydrogen gas.

The fuel injection system may also include a fuel reservoir, a first fuel circuit and a second fuel circuit. The first fuel circuit may fluidly couple the fuel reservoir with the first fuel injector. The second fuel circuit may fluidly couple the fuel reservoir with the second fuel injector.

The fuel reservoir may be configured to provide supply fuel to the first fuel circuit and the second fuel circuit. The supply fuel may be or include the ammonia. The first fuel circuit may be configured to flow the first fuel received from the fuel reservoir to the first fuel injector. The second fuel circuit may be configured to treat the supply fuel received from the fuel reservoir to provide the second fuel to the second fuel injector.

The fuel reservoir may be configured to provide supply fuel to the first fuel circuit and the second fuel circuit. The first fuel circuit may be configured to process the supply fuel received from the fuel reservoir to provide the first fuel to the first fuel injector. The second fuel circuit may be configured to process the supply fuel received from the fuel reservoir to provide the second fuel to the second fuel injector.

The processing of the supply fuel by the first fuel circuit and/or the second fuel circuit may be or otherwise include any one or more of the following: flowing the supply fuel; treating the supply fuel; separating components within the supply fuel; filtering the supply fuel; and/or otherwise processing the supply fuel.

The second fuel circuit may be configured to receive the ammonia from the fuel reservoir. The second fuel circuit may include a fuel treatment device configured to at least partially crack the ammonia to provide at least partially cracked fuel. The at least partially cracked fuel may be or include the second fuel.

The at least partially cracked fuel may also include a byproduct. The byproduct may be or include nitrogen gas and/or the ammonia. The second fuel circuit may include a fuel separation device configured to: (A) retain the second fuel within the second fuel circuit downstream of the fuel separation device for providing to the second fuel injector; and/or (B) at least partially remove the byproduct from the second fuel circuit.

The at least partially cracked fuel may also include a byproduct. The byproduct may be or include nitrogen gas and/or the ammonia. The second fuel circuit may include a fuel separation device configured to: (A) retain the second fuel within the second fuel circuit for providing to the second fuel injector; and/or (B) direct at least some of the byproduct out of the second fuel circuit and into the first fuel circuit.

The first fuel circuit may be configured to receive the ammonia from the fuel reservoir. The first fuel circuit may include a fuel treatment device configured to partially crack the ammonia to provide partially cracked fuel. The partially cracked fuel may include the ammonia, hydrogen gas and nitrogen gas.

The second fuel circuit may include a second fuel reservoir. The second fuel reservoir may be configured to contain a supply of the second fuel for provision to the second fuel injector.

The fuel injection system may also include a first reservoir and a second reservoir. The first reservoir may be configured to contain at least the first fuel. The first reservoir may be upstream of and fluidly coupled with the first fuel injector. The second reservoir may be configured to contain the second fuel. The second reservoir may be upstream of and fluidly coupled with the second fuel injector.

The assembly may also include a combustor with a combustion chamber. The flowpath may include the combustion chamber. The first fuel injector may be configured to direct the first fuel into the flowpath at an inlet to the combustion chamber. The second fuel injector may be configured to direct the second fuel into the flowpath at the inlet to the combustion chamber.

The assembly may also include a combustor with a combustion chamber. The flowpath may include the combustion chamber. The first fuel injector may be configured to direct the first fuel into the flowpath upstream of an inlet to the combustion chamber. The second fuel injector may be configured to direct the second fuel into the flowpath at the inlet to the combustion chamber.

The first fuel injector may be a main fuel injector. The combustion of the first fuel within the flowpath may provide a main flame. The second fuel injector may be a pilot fuel injector. The combustion of the second fuel within the flowpath may provide a pilot flame.

A ratio of the second mass flow of the second fuel to the first mass flow of the first fuel may be equal to or less than 1:9.

The fuel reservoir may be fluidly coupled with the first fuel circuit and the second fuel circuit in parallel.

The supply fuel may consist essentially of/only include the ammonia.

The first fuel may consist essentially of/only include the ammonia.

The first fuel may also include hydrogen gas and/or nitrogen gas.

The second fuel may consist essentially of/only include the hydrogen gas.

The second fuel may also include nitrogen gas.

The second fuel may also include the ammonia.

The fuel treatment device may be arranged upstream of and fluidly coupled with the second fuel injector.

The second fuel injector may be configured with or otherwise include the fuel treatment device.

The assembly may also include a swirler and a combustor with a combustion chamber. The flowpath may include the combustion chamber. The swirler may be configured to direct compressed air into the combustion chamber. The first fuel injector may be configured to direct the first fuel into the flowpath at the swirler. The second fuel injector may be configured to direct the second fuel into the flowpath at the swirler.

The assembly may also include a swirler and a combustor with a combustion chamber. The flowpath may include the combustion chamber. The swirler may be configured to direct compressed air into the combustion chamber. The first fuel injector may be configured to direct the first fuel into the flowpath upstream of the swirler. The second fuel injector may be configured to direct the second fuel into the flowpath at the swirler.

The assembly may also include a swirler and a combustor with a combustion chamber. The flowpath may include the combustion chamber. The swirler may be configured to direct swirled compressed air into the combustion chamber.

The first fuel injector may be configured to direct the first fuel into the flowpath at the swirler.

The first fuel injector may be configured to direct the first fuel into a portion of the flowpath upstream of the swirler.

The combustor may include a bulkhead and a cowl. The portion of the flowpath may be formed by and between the bulkhead and the cowl.

The assembly may also include a convector wall extending along at least a portion of a wall of the combustor. The portion of the flowpath may be formed by and between the convector wall and the wall of the combustor.

The portion of the flowpath may be upstream of the swirler.

The first fuel injector may be configured to direct the first fuel into a portion of the flowpath that is upstream of the combustion chamber and fluidly in parallel with a path through the swirler.

The assembly may also include a bleed duct configured to bleed air from a first portion of the flowpath and provide the bleed air to another structure of the turbine engine. The first fuel injector may be configured to direct the first fuel into a second portion of the flowpath that is upstream of the swirler and downstream of the first portion of the flowpath.

The non-hydrocarbon fuel may be or include ammonia.

The combustor may include a cowl and a bulkhead. The volume may be or include a plenum formed by and between the cowl and the bulkhead.

The volume may be or include a diffuser plenum. The combustor may be arranged within the diffuser plenum.

The assembly may also include a convector wall spaced from the combustor to provide a flow passage between the combustor and the convector wall. The flow passage may be fluidly coupled with and upstream of the combustion chamber. The volume may be or include the flow passage.

The assembly may include a compressor section. The volume may be or include a pre-diffuser passage that leads to a diffuser plenum adjacent the combustor. The compressor section may be configured to provide compressed air to the combustion chamber sequentially through the pre-diffuser passage and the diffuser plenum.

The fuel injection system may also be configured to inject second fuel into a flowpath of the turbine engine for combustion within the combustion chamber. The second fuel may be different than the non-hydrocarbon fuel. The flowpath may include the volume and the combustion chamber.

The non-hydrocarbon fuel and the second fuel may be sourced from a common fuel source.

The second fuel may be or include a second non-hydrocarbon fuel.

The second fuel may be or include a hydrocarbon fuel.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
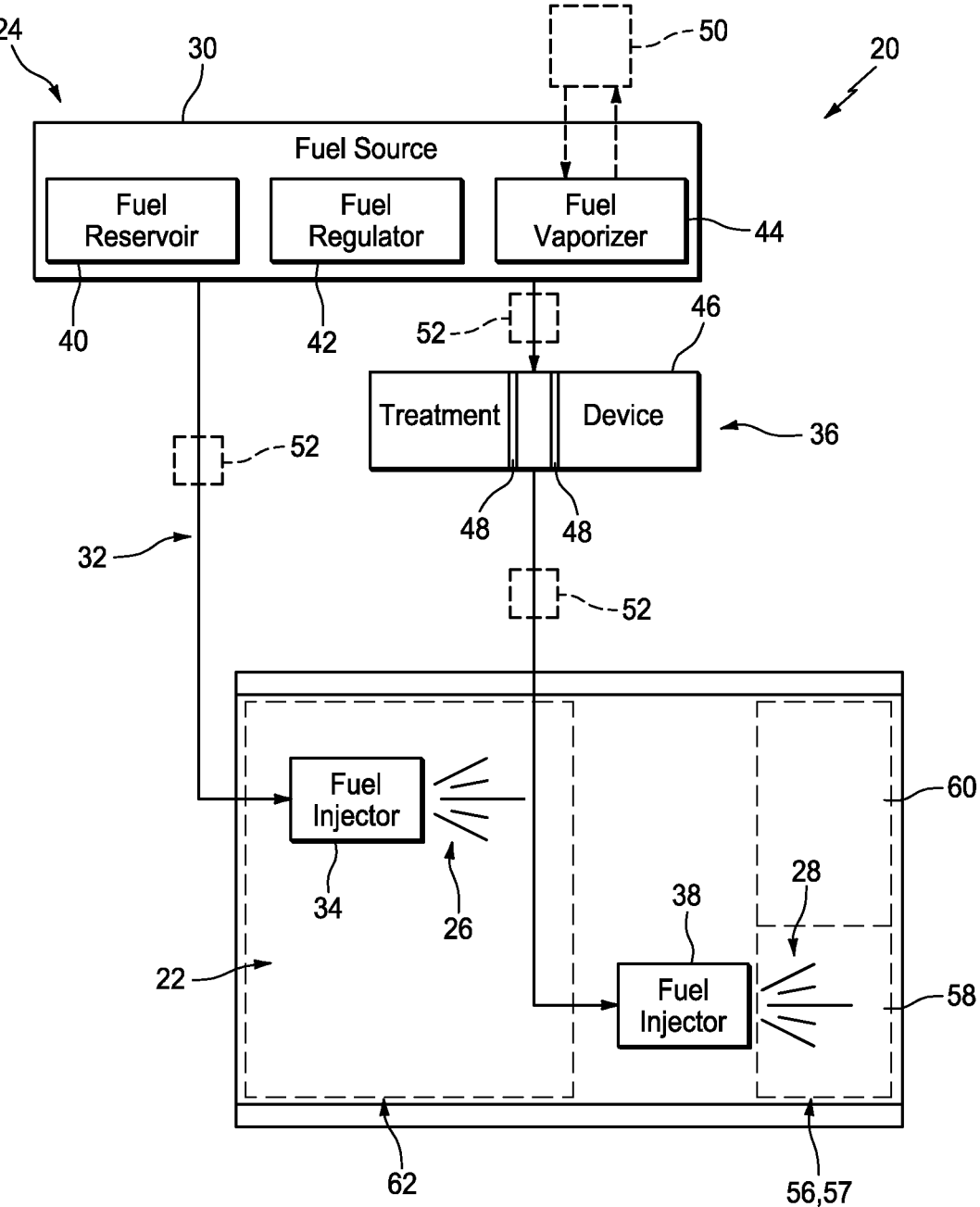
FIG. 1 is a schematic illustration of a turbine engine assembly configured with a system for injecting multiple fuels into a flowpath.

FIG. 1 is a schematic illustration of an assembly 20 for a turbine engine with at least one flowpath 22; e.g., a core flowpath, a gas path, etc. This turbine engine assembly 20 includes a multi-fuel, fuel injection system 24 configured to selectively direct (e.g., inject) at least first fuel 26 and second fuel 28 into the flowpath 22 for combustion.

The flowpath 22 may include one or more (e.g., serially arranged) fluidly coupled passages, chambers, plenums and/or any other internal volumes that collectively form a pathway for fluid flow (e.g., gas flow) within the turbine engine. The flowpath 22 may extend within and/or through any one or more sections of the turbine engine. The flowpath 22 may include, for example: a passage within a compressor section of the turbine engine; a pre-diffuser passage, a diffuser plenum and/or a combustion chamber within a combustor section of the turbine engine; and a passage within a turbine section of the turbine engine. The flowpath 22 may also include a passage within a fan section of the turbine engine, a passage within an exhaust section of the turbine engine and/or a passage in a supplemental thrust section of the turbine engine. The present disclosure, however, is not limited to the foregoing exemplary flowpath configurations.

Figure 2:
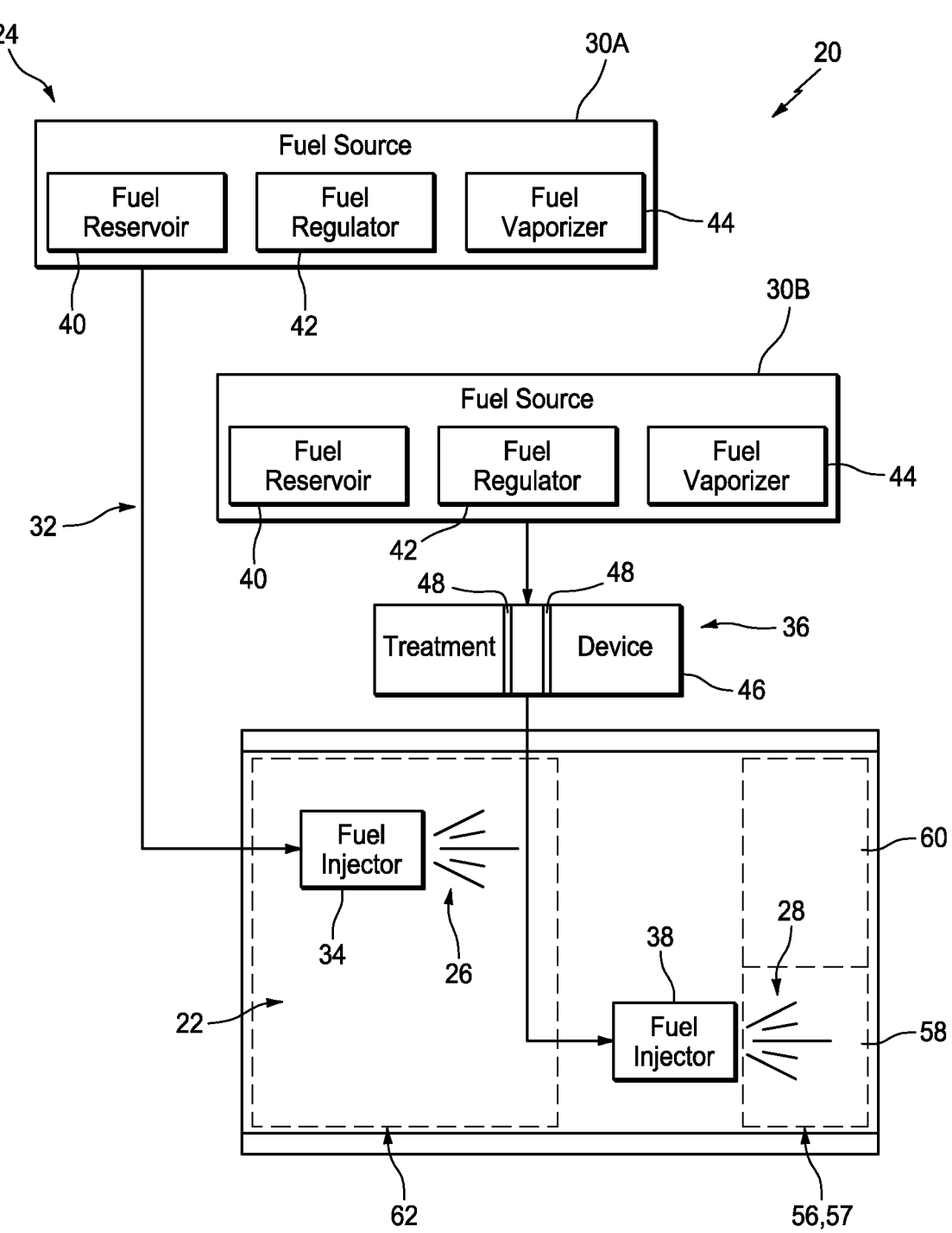
FIG. 2 is a schematic illustration of the turbine engine assembly configured with multiple fuel sources.

The first fuel 26 and the second fuel 28 may each be a non-hydrocarbon fuel (e.g., a hydrocarbon-free fuel) and/or a non-coking fuel. The first fuel 26 and the second fuel 28, for example, may each be or may otherwise include: ammonia ($NH_3$) and/or a fuel composition derivable from the ammonia. The first fuel 26, however, is different from the second fuel 28. More particularly, the first fuel 26 has a different chemical composition (e.g., includes one or more different components) than the second fuel 28. The first fuel 26 and the second fuel 28, however, may be sourced (e.g., received) from a common (the same) fuel source 30 as shown, for example, in FIG. 1. Alternatively, the first fuel 26 and the second fuel 28 may be sourced from different fuel sources 30A and 30B (generally referred to as "30") as shown, for example, in FIG. 2 (see also FIG. 7).

The first fuel 26 directed into the flowpath 22 for combustion may be (e.g., only include) ammonia; e.g., liquid and/or gaseous $NH_3$. Alternatively, the first fuel 26 may include one or more additional fuel components. The first fuel 26, for example, may also include nitrogen (e.g., liquid or gaseous $N_2$) and/or hydrogen (e.g., liquid or gaseous $H_2$). For example, the first fuel 26 may (e.g., at least, substantially or only) include the ammonia (e.g., gaseous $NH_3$) and the nitrogen (e.g., gaseous $N_2$). In another example, the first fuel 26 may (e.g., at least, substantially or only) include the ammonia (e.g., gaseous $NH_3$), the nitrogen (e.g., gaseous $N_2$) and the hydrogen (e.g., gaseous $H_2$). However, a majority (e.g., more than fifty percent (50%)) of the first fuel 26 is typically the ammonia. For example, at least sixty percent (60%), seventy percent (70%), eighty percent (80%), ninety percent (90%) or more of the first fuel 26 may be the ammonia, where the remaining percentage/portion of the first fuel 26 is/are the additional fuel component(s); e.g., the nitrogen and/or the hydrogen. The present disclosure, however, is not limited to the foregoing exemplary first fuel compositions. For example, the first fuel 26 may be or may include any composition of fuel component(s) where a percentage of the ammonia (e.g., gaseous $NH_3$) in the first fuel 26 is greater than a percentage of the ammonia (e.g., gaseous $NH_3$) in the second fuel 28.

The second fuel 28 directed into the flowpath 22 for combustion may be (e.g., only include) the hydrogen; e.g., liquid or gaseous $H_2$. Alternatively, the second fuel 28 may include one or more additional fuel components. The second fuel 28, for example, may also include nitrogen (e.g., liquid or gaseous $N_2$) and/or ammonia (liquid and/or gaseous $NH_3$). For example, the second fuel 28 may (e.g., at least, substantially or only) include the hydrogen (e.g., gaseous $H_2$) and the nitrogen (e.g., gaseous $N_2$). In another example, the second fuel 28 may (e.g., at least, substantially or only) include the hydrogen (e.g., gaseous $H_2$), the nitrogen (e.g., gaseous $N_2$) and the ammonia (gaseous $NH_3$). However, a majority (e.g., more than fifty percent (50%)) of the second fuel 28 is typically the hydrogen. For example, at least sixty percent (60%), seventy percent (70%), eighty percent (80%), ninety percent (90%) or more of the second fuel 28 may be the hydrogen, where the remaining percentage/portion of the second fuel 28 is/are the additional fuel component(s); e.g., the nitrogen and/or the ammonia. The present disclosure, however, is not limited to the foregoing exemplary second fuel compositions. For example, the second fuel 28 may be or may include any composition of fuel component(s) where a percentage of the pure hydrogen (e.g., gaseous $H_2$) in the second fuel 28 is greater than a percentage of the pure hydrogen (e.g., gaseous $H_2$) in the first fuel 26.

The fuel injection system 24 of FIG. 1 includes a first fuel circuit 32, a first fuel injector 34, a second fuel circuit 36 and a second fuel injector 38. The fuel injection system 24 of FIG. 1 also includes the fuel source 30.

The fuel source 30 is configured to provide supply fuel to the first fuel circuit 32 and/or the second fuel circuit 36 during turbine engine operation. The fuel source 30 may also be configured to store the supply fuel during turbine engine operation and/or while the turbine engine is non-operational; e.g., before and/or after turbine engine operation.

The supply fuel stored and/or provided by the fuel source 30 is a fuel which can be processed (e.g., delivered and/or treated) to provide the first fuel 26 and/or the second fuel 28. The supply fuel, for example, may be a non-hydrocarbon fuel (e.g., hydrocarbon-free fuel) and/or a non-coking fuel. The supply fuel, more particularly, may be (e.g., only include) the ammonia; e.g., gaseous or liquid $NH_3$. The present disclosure, however, is not limited to the foregoing exemplary supply fuel.

The fuel source 30 of FIG. 1 includes a fuel reservoir 40 and a fuel regulator 42. The fuel reservoir 40 may be configured as or otherwise include a container; e.g., a tank, a cylinder, a pressure vessel, a bladder, etc. The fuel reservoir 40 is configured to contain and hold a quantity of the supply fuel. The fuel regulator 42 may be configured as or otherwise include a pump and/or a valve. The fuel regulator 42 is configured to control flow of the supply fuel from the fuel reservoir 40 to one or more downstream components of the turbine engine. The fuel regulator 42 of FIG. 1, for example, directs (e.g., pumps) the supply fuel out from the fuel reservoir 40 to at least the first fuel circuit 32 and the second fuel circuit 36.

Where the supply fuel is stored in the fuel reservoir 40 as liquid ammonia, the fuel source 30 may also include a fuel vaporizer 44. This fuel vaporizer 44 of FIG. 1 is configured to at least partially or completely vaporize the supply fuel directed out of the fuel reservoir 40 and supplied to the first fuel circuit 32 and/or the second fuel circuit 36. The fuel vaporizer 44, for example, may be configured as or otherwise include an electric heater and/or a fluid-to-fluid heat exchanger (e.g., a liquid-to-liquid heat exchanger or a gas-to-liquid heat exchanger). The fuel source 30 may thereby provide the supply fuel to the first fuel circuit 32 and/or the second fuel circuit 36 as gaseous ammonia. The fuel vaporizer 44 may be fluidly coupled (e.g., in serial) between the fuel reservoir 40 and the fuel regulator 42. Alternatively, the fuel regulator 42 may be fluidly coupled (e.g., in serial) between the fuel reservoir 40 and the fuel vaporizer 44. Of course, in other embodiments, one or more of the fuel circuits 32, 36 may each also or alternatively include its own dedicated fuel vaporizer.

The first fuel circuit 32 is configured to process the supply fuel received from the fuel source 30 to provide the first fuel 26. The first fuel circuit 32 is also configured to provide the first fuel 26 to the first fuel injector 34. More particularly, the first fuel circuit 32 of FIG. 1 is configured to direct (e.g., flow) the supply fuel (e.g., gaseous ammonia) from the fuel source 30 to the first fuel injector 34. In this embodiment, the first fuel 26 is the same as the supply fuel; e.g., both the supply fuel and the first fuel 26 are or include the ammonia. However, the present disclosure is not limited thereto as described below in further detail.

The first fuel circuit 32 includes a first fuel circuit passage that fluidly couples the fuel source 30 with the downstream first fuel injector 34. The first fuel circuit 32 and the first fuel circuit passage of FIG. 1, for example, extend between and are connected to the fuel source 30 and the first fuel injector 34.

The first fuel circuit passage may be formed by an internal bore of/through at least one conduit; e.g., a pipe, a hose, a tube, etc. The first fuel circuit passage may also or alternatively be formed by an internal bore, an internal channel and/or an internal void within and/or through one or more other fuel devices and/or structures. Examples of such other fluid devices and/or structures include, but are not limited to, a fuel heater, a fuel cooler, a fluid-to-fluid heat exchanger, a fuel filter, a valve, a pump, an inline fuel reservoir, a sensor and/or a manifold.

The first fuel injector 34 is configured to receive the first fuel 26 from the first fuel circuit 32. The first fuel injector 34 is also configured to direct (e.g., inject) the first fuel 26 into the flowpath 22 for subsequent combustion downstream within the flowpath 22.

The second fuel circuit 36 is configured to process the supply fuel received from the fuel source 30 to provide the second fuel 28. The second fuel circuit 36 is also configured to provide the second fuel 28 to the second fuel injector 38. More particularly, the second fuel circuit 36 of FIG. 1 is configured to treat the supply fuel and provide that treated supply fuel (now referred to as the second fuel 28) to the second fuel injector 38. This treatment of the supply fuel may at least partially or completely crack the supply fuel to provide at least partially cracked or completely cracked supply fuel—the second fuel 28. For example, where the supply fuel received from the fuel source 30 is gaseous ammonia, the second fuel circuit 36 may partially crack that gaseous ammonia to provide a mixture of hydrogen ($H_2$) gas, nitrogen ($N_2$) gas and ammonia ($NH_3$) gas. Alternatively, the second fuel circuit 36 may completely crack the gaseous ammonia to provide a mixture of the hydrogen gas and the nitrogen gas. In addition, the second fuel circuit 36 may separate the hydrogen gas from the nitrogen gas and any residual ammonia gas, to provide the second fuel 28 to injector 38 that is substantially hydrogen ($H_2$) gas. The remaining nitrogen gas and ammonia gas, after separation from the hydrogen gas, can be returned to fuel source 30 or delivered to the first fuel circuit 32; e.g., see FIG. 7.

The second fuel circuit 36 includes a second fuel circuit passage that fluidly couples the fuel source 30 with the downstream second fuel injector 38. The second fuel circuit 36 and the second fuel circuit passage of FIG. 1, for example, extend between and are connected to the fuel source 30 and the second fuel injector 38.

The second fuel circuit passage is formed by a pathway (or pathways) through a fuel treatment device 46. This fuel treatment device 46 is configured to at least partially or completely crack the supply fuel to provide the second fuel 28. The fuel treatment device 46, for example, may be configured as or otherwise include a heater (e.g., an electric heater) and/or a fluid-to-fluid heat exchanger (e.g., a liquid-to-liquid heat exchanger, a gas-to-liquid heat exchanger or a gas-to-gas heat exchanger). The pathway through the fuel treatment device 46 may be at least partially (or completely) lined, coated and/or otherwise formed by at least one catalyst 48, or partially filled with catalyst-containing material such as pellets or honeycomb. Examples of the catalyst 48 include, but are not limited to, nickel (Ni), iron (Fe), ruthenium (Ru) and platinum (Pt). The present disclosure, however, is not limited to the foregoing exemplary catalytic materials. The fuel treatment device 46 may also be configured to separate, after cracking, the hydrogen gas from the nitrogen gas and any residual ammonia gas; e.g., see FIG. 7.

The second fuel circuit passage is also formed by an internal bore of/through one or more conduits; e.g., pipes, hoses, tubes, etc. The second fuel circuit passage may also or alternatively be formed by an internal bore, an internal channel and/or an internal void within and/or through one or more other fuel devices and/or structures. Examples of such other fluid devices and/or structures include, but are not limited to, a fuel heater, a fuel cooler, a fluid-to-fluid heat exchanger, a fuel filter, a valve, a pump, an inline fuel reservoir, a sensor and/or a manifold.

The second fuel injector 38 is configured to receive the second fuel 28 from the second fuel circuit 36. The second fuel injector 38 is also configured to direct (e.g., inject) the second fuel 28 into the flowpath 22 for subsequent combustion downstream within the flowpath 22.

During operation of the turbine engine assembly 20 of FIG. 1, the fuel source 30 provides the supply fuel (e.g., ammonia gas) to the first fuel circuit 32 and the second fuel circuit 36. The fuel source 30 of FIG. 1 and its components 40, 42 and 44 are connected in parallel with the first fuel circuit 32 and the second fuel circuit 36. The first fuel circuit 32 and the second fuel circuit 36 may thereby each receive the supply fuel (e.g., $NH_3$ gas) from the fuel source 30 independent of the other respective circuit 36, 32.

The first fuel circuit 32 processes the supply fuel (e.g., $NH_3$ gas) received from the fuel source 30 to provide the first fuel 26 (e.g., $NH_3$ gas). More particularly, the first fuel circuit 32 of FIG. 1 directs (e.g., flows) the supply fuel received from the fuel source 30 to the first fuel injector 34 as the first fuel 26. The first fuel injector 34 directs (e.g., injects) the first fuel 26 (e.g., the supply fuel) received from the first fuel circuit 32 into the flowpath 22 for combustion within the flowpath 22.

The second fuel circuit 36 processes the supply fuel (e.g., $NH_3$ gas) received from the fuel source 30 to provide the second fuel 28 (e.g., a mixture of $H_2$ gas, $N_2$ gas and $NH_3$ gas). More particularly, the second fuel circuit 36 of FIG. 1 treats (e.g., at least partially or completely cracks) the supply fuel to provide that treated supply fuel (e.g., at least partially or completely cracked supply fuel)—the second fuel 28—to the second fuel injector 38. The second fuel injector 38 directs (e.g., injects) the second fuel 28 received from the second fuel circuit 36 into the flowpath 22 for combustion within the flowpath 22.

By using a non-hydrocarbon fuel such as ammonia and/or components ($H_2$ gas and $N_2$ gas) derived therefrom, the turbine engine assembly 20 may operate without, for example, producing potentially harmful emissions such as, but not limited to, carbon dioxide ($CO_2$) emissions and non-volatile particulate matter (nvPM) emissions (also referred to as "black carbon"). In addition, such a non-hydrocarbon fuel may be operable to absorb a significant quantity of heat without coking like a traditional hydrocarbon fuel such as kerosene (e.g., jet fuel). The supply fuel, the first fuel 26 and/or the second fuel 28 may thereby be utilized for cooling one or more other components of the turbine engine and/or one or more other paired systems such as, but not limited to, an aircraft cabin climate system. The fuel vaporizer 44 (e.g., heat exchanger) of FIG. 1, for example, may be fluidly coupled with another fluid system 50; e.g., a lubrication system, a coolant system, another fuel system, a heating and/or cooling system, etc. Heated fluid (e.g., coolant, lubricant, air, etc.) from the other fluid system 50 may be directed through the fuel vaporizer 44, where the fuel vaporizer 44 facilitates a transfer of heat energy from the heated fluid to the fuel (e.g., the liquid ammonia) thereby cooling the fluid for the other fluid system 50. The heat absorption capability of ammonia may thereby be used to recapture waste heat energy and improve efficiency of the turbine engine in a manner generally not feasible with a traditional hydrocarbon engine. The present disclosure, of course, is not limited to the foregoing heat transfer arrangement. For example, in other embodiments, one or more heat exchangers 52 may also or alternatively be fluidly coupled between the fuel source 30 and a respective fuel circuit 32, 36, fluidly coupled inline within a respective one of the fuel circuits 32, 36, or otherwise arranged.

The high heat absorption potential of a non-hydrocarbon fuel such as ammonia may come from its high heat of vaporization (as it undergoes phase change from liquid to gas), its coke-free nature at high temperatures and/or its propensity to undergo endothermic cracking upon heating to form hydrogen gas and nitrogen gas. Thus, ammonia may be used as fuel in a gas turbine engine both in its pure form ($NH_3$) and its cracked form ($H_2$ and $N_2$).

A non-hydrocarbon fuel such as ammonia may have relatively narrow flammability limits and relatively slow flame speeds. Thus, ammonia fuel may be more difficult to combust/burn than a traditional hydrocarbon fuel. Ammonia fuel may therefore be mixed with (e.g., compressed) air at a higher temperature, pressure and/or concentration than a traditional hydrocarbon fuel without or with relatively low concern for ignition or flame propagation (including flashback) in an air-fuel mixing region prior to combustion within, for example, a combustion region 56 of the flowpath 22; e.g., the combustion chamber 57. Ammonia fuel may thereby be used to provide premixing with the (e.g., compressed) air prior to combustion. Such premixing may lower NOx emissions of the turbine engine. Premixing may also or alternatively provide control of combustion dynamics; e.g., control of combustion-induced pressure oscillations. Various premixing methodologies and techniques are discussed below in further detail.

Ammonia fuel, however, may have flame anchoring issues and/or flame stability issues given its lower flammability limits and flame speeds. This may be particularly true at low power conditions where combustor inlet temperatures are relatively low. Ammonia fuel may also or alternatively have slip issues (e.g., unburned ammonia may be present in the exhaust) when combustion efficiency is low (even if combustion is stable). This may be particularly true at low power conditions where combustor inlet temperatures and combustor outlet temperatures are relatively low.

When combusting a non-hydrocarbon fuel such as ammonia at low power conditions, there is a need to provide continuous, stable combustion (e.g., good flame holding) and/or relatively high combustion efficiency (e.g., low ammonia slip). Thus, the ammonia fuel may be paired with another fuel with higher flame speeds and/or wider flammability limits. The turbine engine assembly 20 of FIG. 1 therefore includes both the first and the second fuel injectors 34 and 38 to provide a mixture of ammonia gas, hydrogen gas and nitrogen gas for combustion. More particularly, the second fuel injector 38 injects the second fuel 28 (e.g., at least hydrogen gas) for providing a relatively stable (e.g., pilot) flame within a (e.g., pilot) zone 58 (see also FIGS. 3 and 4) of the combustion region 56 of the flowpath 22. This second fuel flame may also increase the temperature within the combustion region 56 of the flowpath 22. This second fuel flame within the (e.g., pilot) zone 58 may be utilized for igniting and/or sustaining ignition of the first fuel 26 injected by the first fuel injector 34 in another (e.g., main) zone 60 (see also FIGS. 3 and 4) of the combustion region 56 of the flowpath 22, where the flame in the (e.g., main) zone 60 is adjacent and in contact with (e.g., overlapping) the flame in the (e.g., pilot) zone 58. The second fuel injector 38 is thereby operable as a pilot fuel injector for the (e.g., main) first fuel injector 34.

Unlike pure ammonia ($NH_3$), flame speeds and flammability limits of cracked ammonia (e.g., a mixture hydrogen gas and nitrogen gas with or without residual ammonia gas) can be relatively close to the flame speeds and flammability limits of a traditional hydrocarbon fuel, depending on the degree of cracking. Thus, premixing (e.g., completely) cracked ammonia with (e.g., compressed) air upstream of the combustion region 56 of the flowpath 22 (e.g., the combustion chamber 57) may increase likelihood of flashback and/or flame holding in the pre-mixer. The turbine engine assembly 20 of FIG. 1 thereby arranges the second fuel injector 38 downstream of the first fuel injector 34. The first fuel injector 34, for example, may be configured to direct the first fuel 26 into an upstream premix region 62 of the flowpath 22 (e.g., a diffuser plenum, a cowl plenum, etc.) whereas the second fuel injector 38 may be configured to direct the second fuel 28 into the downstream combustion region 56 of the flowpath 22; e.g., the combustion chamber 57. Optionally (or alternatively), the first fuel injector 34 may also be configured to inject the first fuel 26 directly into the combustion region 56 without premixing.

As discussed above, the first fuel injector 34 may be configured as a main fuel injector and the second fuel injector 38 may be configured as a pilot fuel injector. With such an arrangement, the first fuel injector 34 may be configured to inject a (e.g., maximum) first mass flow of the first fuel 26 into the flowpath 22. The second fuel injector 38 may be configured to inject a (e.g., maximum) second mass flow of the second fuel 28 into the flowpath 22. The second mass flow of the second fuel 28 may be different (e.g., less) than the first mass flow of the first fuel 26. A ratio of the second mass flow of the second fuel 28 to the first mass flow of the first fuel 26 may be, for example, equal to or less than 1:8, 1:9 or 1:10. The present disclosure, however, is not limited to the foregoing exemplary fuel injection ratios.

The second fuel injector 38 may be configured such that its second mass flow of the second fuel 28 is sufficient to provide rapid, robust and/or near-complete combustion of the second fuel 28 within the (e.g., pilot) zone 58 before spreading into the (e.g., main) zone 60. The (e.g., pilot) flame may thereby be independently stable and capable of igniting the first fuel 26 in the (e.g., main) zone 60 to provide the (e.g., main) flame. The (e.g., main) zone 60 may be located in a region of the flowpath 22 (e.g., the combustion chamber 57) which includes aerodynamic back mixing to facilitate anchoring of the (e.g., main) flame. The (e.g., pilot) flame therefore may be relatively small; e.g., where the ratio of the second mass flow to the first mass flow is equal to or less than 1:8, 1:9 or 1:10 as described above. The back mixing may be facilitated by configuring the second fuel injector 38 with a bluff body, a backwards facing step and/or providing a vortex breakdown of swirling inflow. Examples of such configurations are substantially shown in FIGS. 3 and 4.

Figure 5:
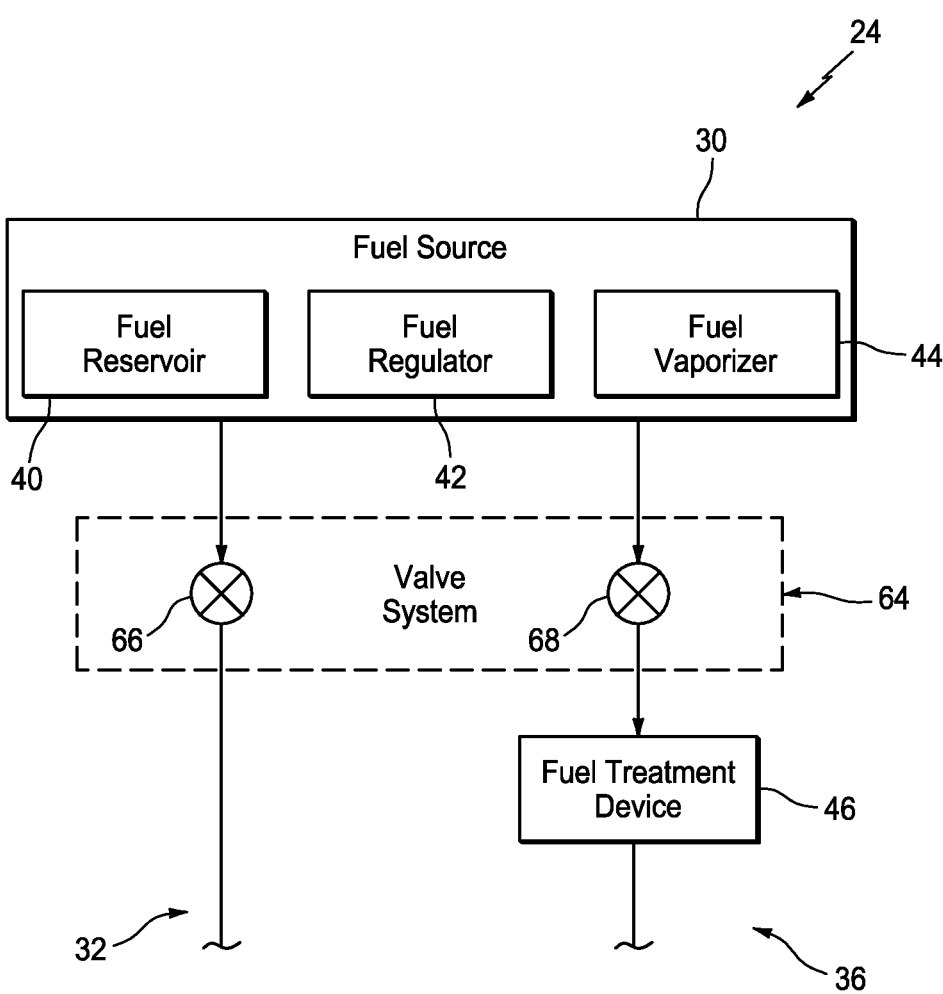
FIG. 5 is a schematic illustration of an upstream portion of the fuel injection system configured with a valve system.

Referring again to FIG. 1, the first fuel injector 34 and the second fuel injector 38 may be configured to operate concurrently in some modes of operation. The first fuel injector 34 and the second fuel injector 38 may also or alternatively be configured to operate discretely in other mode of operation. For example, referring to FIG. 5, the turbine engine system may include a valve system 64 configured to selectively regulate the supply fuel to the first fuel circuit 32 and/or the second fuel circuit 36. The valve system 64 of FIG. 5, for example, includes a first valve 66 and a second valve 68.

The first valve 66 is fluidly coupled (e.g., serially) inline between the fuel source 30 and the first fuel circuit 32. This first valve 66 may be configurable in a (e.g., fully) open position and a (e.g., fully) closed position. In the open position, the supply fuel may flow from the fuel source 30 to the first fuel circuit 32 unimpeded. In the closed position, the first valve 66 may prevent any flow of the supply fuel from the fuel source 30 to the first fuel circuit 32. Of course, in other embodiments, the first valve 66 may be configured to operate in one or more intermediate (e.g., partially) open positions so as to permit a limited flow of the supply fuel from the fuel source 30 to the first fuel circuit 32.

The second valve 68 is fluidly coupled (e.g., serially) inline between the fuel source 30 and the second fuel circuit 36. This second valve 68 may be configurable in a (e.g., fully) open position and a (e.g., fully) closed position. In the open position, the supply fuel may flow from the fuel source 30 to the second fuel circuit 36 unimpeded. In the closed position, the second valve 68 may prevent any flow of the supply fuel from the fuel source 30 to the second fuel circuit 36. Of course, in other embodiments, the second valve 68 may be configured to operate in one or more intermediate (e.g., partially) open positions so as to permit a limited flow of the supply fuel from the fuel source 30 to the second fuel circuit 36.

In a first mode of operation during, for example, low engine power operation (e.g., engine ignition, engine startup, engine shutdown, engine idle), the first valve 66 may be configured to shutoff the supply of fuel from the fuel source 30 to the first fuel circuit 32. The second valve 68, however, may be configured in its (e.g., fully) open position such that the second fuel circuit 36 receives a (e.g., full) flow of fuel form the fuel source 30. In this first mode, the second fuel injector 38 (see FIG. 1) is operational and the first fuel injector 34 (see FIG. 1) is non-operation. Thus, the second fuel injector 38 may be sized to facilitate full turbine engine operation during its low engine power operation.

In a second mode of operation during, for example, high engine power operation (e.g., engine cruise, aircraft takeoff, etc.), the first valve 66 may be configured in its (e.g., fully or partially) open position such that the first fuel circuit 32 receives a (e.g., full or partial) flow of fuel from the fuel source 30. The second valve 68 may also be configured in its (e.g., fully or partially) open position such that the second fuel circuit 36 receives a (e.g., full or partial) flow of fuel from the fuel source 30. In this second mode, both the first fuel injector 34 (see FIG. 1) and the second fuel injector 38 (see FIG. 1) are operation. Of course, in other embodiments, the second valve 68 may be configured to shutoff the supply of fuel from the fuel source 30 to the second fuel circuit 36 during the second mode such that the second fuel injector 38 is non-operational. This may occur, for example, where the first fuel 26 injected into the flowpath 22 is heated to a high enough temperature to facilitate, for example, stable combustion and/or complete combustion of the first fuel 26.

Figures 3, 4:
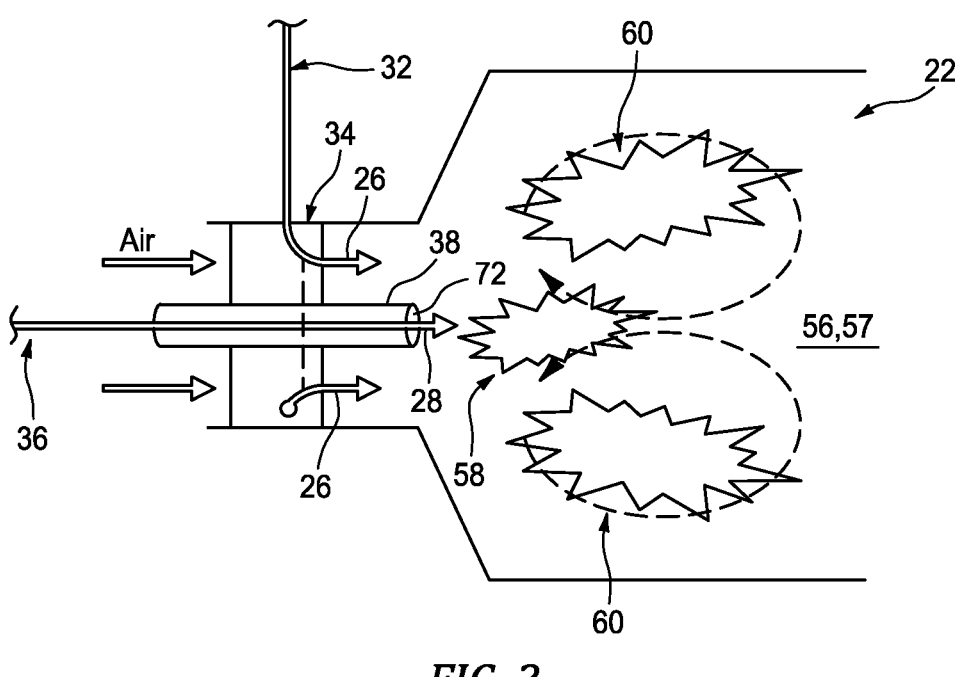
FIG. 3 is a schematic illustration of a downstream portion of the fuel injection system depicted with different operational flame zones in the flowpath.
FIG. 4 is a schematic illustration of a downstream portion of the fuel injection system depicted with different operational flame zones in the flowpath, which fuel injection system is configured with a fuel treatment device within a fuel injector.

Referring to FIG. 4, the fuel injection system 24 may include a fuel treatment device 70 configured with (e.g., embedded in, integral with) the second fuel injector 38. The second fuel injector 38, for example, may include the fuel treatment device 70 in an upstream portion thereof, where this fuel treatment device 70 is positioned upstream of and fluidly coupled with a nozzle orifice 72 of the second fuel injector 38. This fuel treatment device 70 may be configured to at least partially or completely crack fuel provided to the second fuel injector 38 from the second fuel circuit 36. The fuel treatment device 70 of FIG. 4 may be configured as or otherwise include a heater (e.g., an electric heater) and/or a fluid-to-fluid heat exchanger (e.g., a gas-to-gas heat exchanger). A pathway through the fuel treatment device 70 may be at least partially (or completely) lined, coated and/or otherwise formed by at least one catalyst 74, or partially filled with catalyst-containing material such as pellets or honeycomb. Examples of the catalyst 74 include, but are not limited to, nickel (Ni), iron (Fe), ruthenium (Ru) and platinum (Pt). The present disclosure, however, is not limited to the foregoing exemplary catalytic materials.

In some embodiments, this fuel treatment device 70 of FIG. 4 may replace the fuel treatment device 46 (e.g., see FIG. 1); e.g., the fuel treatment device 46 may be omitted and the second fuel circuit 36 may simply flow the supply fuel to the second fuel injector 38 and its fuel treatment device 70. In other embodiments, the fuel treatment device 70 of FIG. 4 may be provided in addition to and downstream of the fuel treatment device 46 (see FIG. 1) in the second fuel circuit 36.

Figure 6:
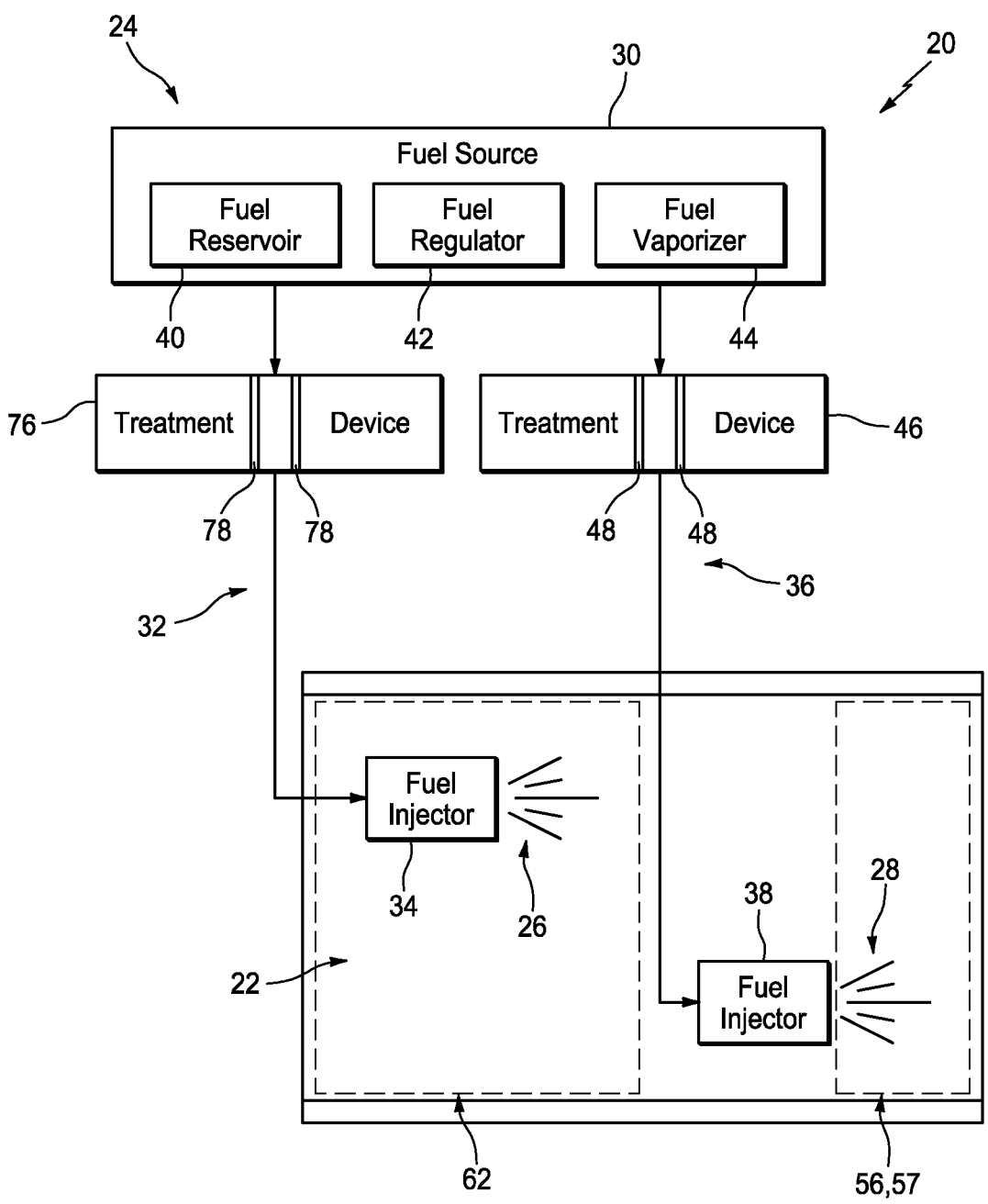
FIG. 6 is a schematic illustration of the turbine engine assembly configured with an additional fuel treatment device.

In some embodiments, referring to FIG. 6, the first fuel circuit 32 may be configured with/include a fuel treatment device 76. This fuel treatment device 76 is configured to partially crack the supply fuel to provide the first fuel 26; e.g., a mixture of ammonia gas, hydrogen gas and nitrogen gas. The fuel treatment device 76, for example, may be configured as or otherwise include a heater (e.g., an electric heater) and/or a fluid-to-fluid heat exchanger (e.g., a liquid-to-liquid heat exchanger, a gas-to-liquid heat exchanger or a gas-to-gas heat exchanger). A pathway through the fuel treatment device 76 may be at least partially (or completely) lined, coated and/or otherwise formed by at least one catalyst 78, or partially filled with catalyst-containing material such as pellets or honeycomb. Examples of the catalyst 78 include, but are not limited to, nickel (Ni), iron (Fe), ruthenium (Ru) and platinum (Pt). The present disclosure, however, is not limited to the foregoing exemplary catalytic materials.

Figure 7:
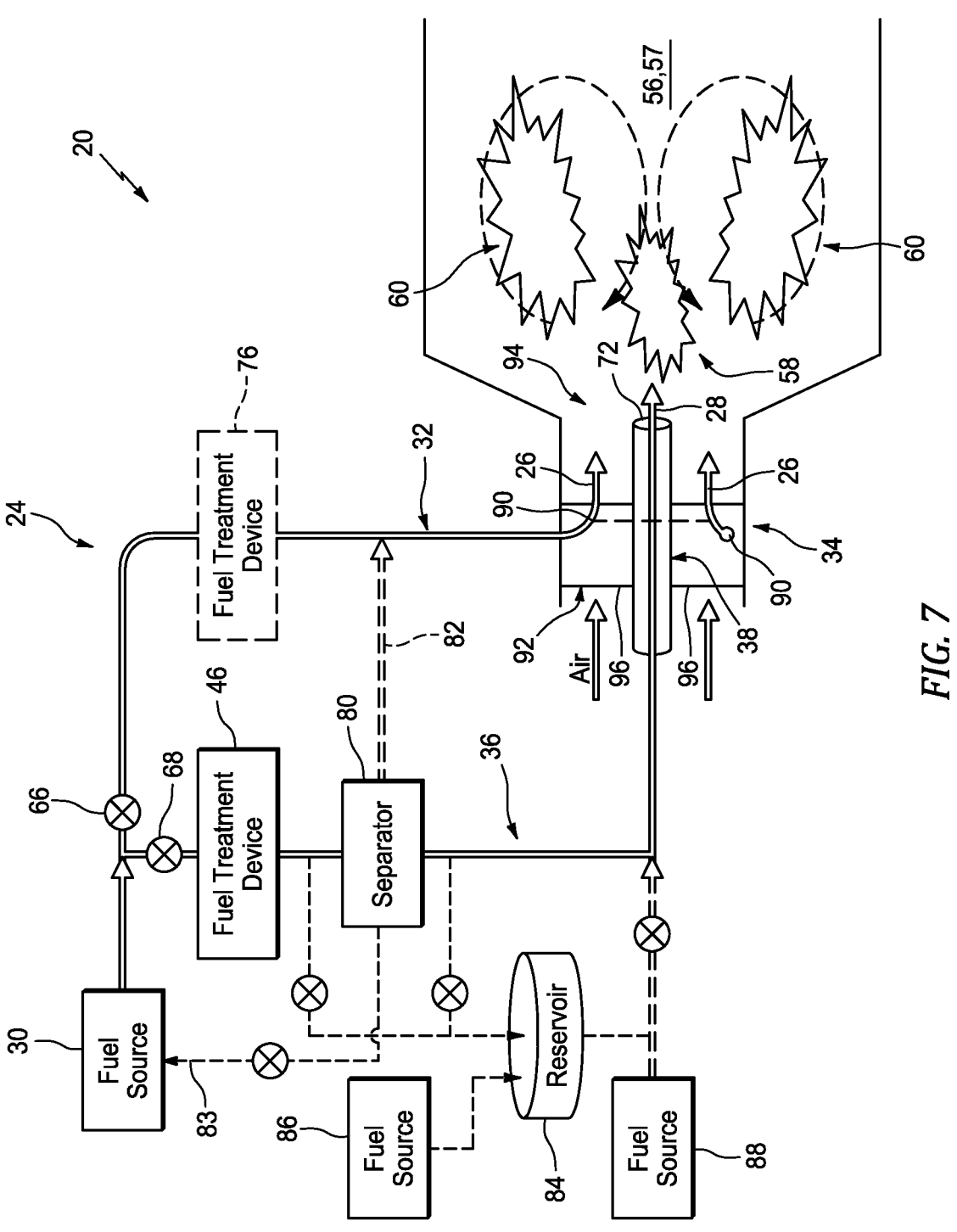
FIG. 7 is a schematic illustration of the fuel injection system depicted with different operational flame zones in the flowpath, which fuel injection system is configured with one or more additional fuel circuit components for processing fuel.

In some embodiments, referring to FIG. 7, the second fuel circuit 36 may be configured with/include a fuel separator 80. This fuel separator 80 is fluidly coupled inline (e.g., serially) between the fuel treatment device 46 and the second fuel injector 38. The fuel separator 80 is configured to separate the at least partially (or completely) cracked supply fuel into two or more groupings. For example, following the partial cracking of the ammonia via the fuel treatment device 46, the fuel separator 80 may receive the (remaining/uncracked) ammonia gas, the hydrogen gas and the nitrogen gas. The fuel separator 80 may separate these components into two groupings. The first grouping (e.g., the second fuel 28) may be/(e.g., substantially or only) include the hydrogen gas. The second grouping (e.g., a byproduct of providing the first fuel 26) may be/(e.g., substantially or only) include a mixture of the (remaining/uncracked) ammonia gas and the nitrogen gas. Of course, in other embodiments, the first grouping may also include the nitrogen gas and/or the second grouping may (e.g., substantially or completely) omit the nitrogen gas.

The fuel separator 80 may retain the first grouping ($H_2$ gas, or $H_2$ gas and $N_2$ gas) within the second fuel circuit 36 (downstream of the fuel separator 80) for subsequent delivery to the second fuel injector 38. The second fuel 28 directed into the flowpath 22 by the second fuel injector 38 may thereby be substantially pure hydrogen gas, or a mixture (e.g., substantially) of hydrogen gas and nitrogen gas. The fuel separator 80, however, may remove the second grouping (e.g., $NH_3$ gas and $N_2$ gas, or $NH_3$ gas) from the second fuel circuit 36. The fuel separator 80, for example, may divert the second grouping from the second fuel circuit 36 and into the first fuel circuit 32 via a bridge 82 for combination with, for example, the supply fuel received from the fuel source 30. The first fuel 26 directed into the flowpath 22 by the first fuel injector 34 may thereby substantially be a mixture (e.g., substantially) of ammonia gas and nitrogen gas, or a mixture (e.g., substantially) of ammonia gas, nitrogen gas and hydrogen gas. In addition or alternatively, the fuel separator 80 may divert some or all of the second grouping from the second fuel circuit 36 back into the fuel source 30 via an optional return line 83, either directly or after cooling and condensing the $NH_3$, for later use.

In some embodiments, still referring to FIG. 7, the second fuel circuit 36 may be configured with an additional fuel reservoir 84. This fuel reservoir 84 is configured to receive the second fuel 28 from the fuel separator 80, or alternatively from the fuel treatment device 46 where, for example, the fuel separator 80 is omitted. The fuel reservoir 84 is configured to store the second fuel 28 for subsequent provision to the second fuel injector 38. For example, the fuel reservoir 84 may be charged (e.g., filled) during normal turbine engine assembly operation; e.g., where the fuel treatment device 46 is operable to sufficiently crack the supply fuel. However, when the turbine engine is in a low power mode of operation (e.g., during initial startup), the fuel reservoir 84 may supply some or all of the stored second fuel 28 to the second fuel injector 38 when, for example, the fuel treatment device 46 cannot sufficiently crack the supply fuel. Of course, in other embodiments, the fuel reservoir 84 may also or alternatively provide the second fuel 28 to the second fuel injector 38 during other mode(s) of operation; e.g., to boost fuel delivery to the second fuel injector 38 during high engine power operation.

The fuel reservoir 84 is described above as being charged (e.g., filled) by the output from the fuel separator 80 or the fuel treatment device 46. In some embodiments, however, the fuel reservoir 84 may also or alternatively be charged by another fuel source 86 outside of the turbine engine; e.g., a ground based fuel truck, a ground based pump, etc.

In some embodiments, still referring to FIG. 7, the second fuel injector 38 may be configured to receive the second fuel 28 (or another fuel such as, for example, pure hydrogen gas) from another fuel source 88 outside of the turbine engine. The second fuel injector 38, for example, may be fluidly coupled to the fuel source 88 during, for example, turbine engine startup and/or turbine engine shutdown. This fuel source 88 may be a ground based fuel truck, a ground based pump, or other device that is readily available, for example, at an aircraft gate. Thus, the second fuel injector 38 may receive sufficient second fuel 28 even where the fuel reservoir 84 is depleted (or omitted) and/or the fuel treatment device 46 is not yet (e.g., fully) functional.

In some embodiments, still referring to FIG. 7, the first fuel injector 34 may include one or more fuel injector orifices 90; e.g., nozzle orifices. The turbine engine assembly 20 of FIG. 3, for example, includes an air swirler 92 arranged within the flowpath 22; e.g., at (e.g., on, adjacent or proximate) an inlet 94 into the combustion chamber 57. This air swirler 92 includes a plurality of vanes 96 arranged in an annular array; e.g., about an outer periphery of the second fuel injector 38. One or more or all of the swirler vanes 96 may be configured with an internal passage that leads to a respective one of the fuel injector orifices 90. The first fuel injector 34 is therefore configured with the air swirler 92. The first fuel injector 34 may thereby mix (e.g., inject) the first fuel 26 with the swirling (e.g., compressed) air. Of course, in other embodiments, the first fuel injector 34 may be configured discrete from the air swirler 92. The first fuel injector 34 may thereby direct the first fuel 26 into the flowpath 22 upstream or downstream of the air swirler 92, or at the air swirler 92 via, for example, one or more orifices in an outer shroud surrounding the vanes 96.

In some embodiments, the first fuel injector 34 may be one of a plurality of first fuel injectors 34 arranged circumferentially about, for example, an axial centerline of the turbine engine. The second fuel injector 38 may also or alternatively be one of a plurality of second fuel injectors 38 arranged circumferentially about, for example, the axial centerline of the turbine engine.

Figure 8:
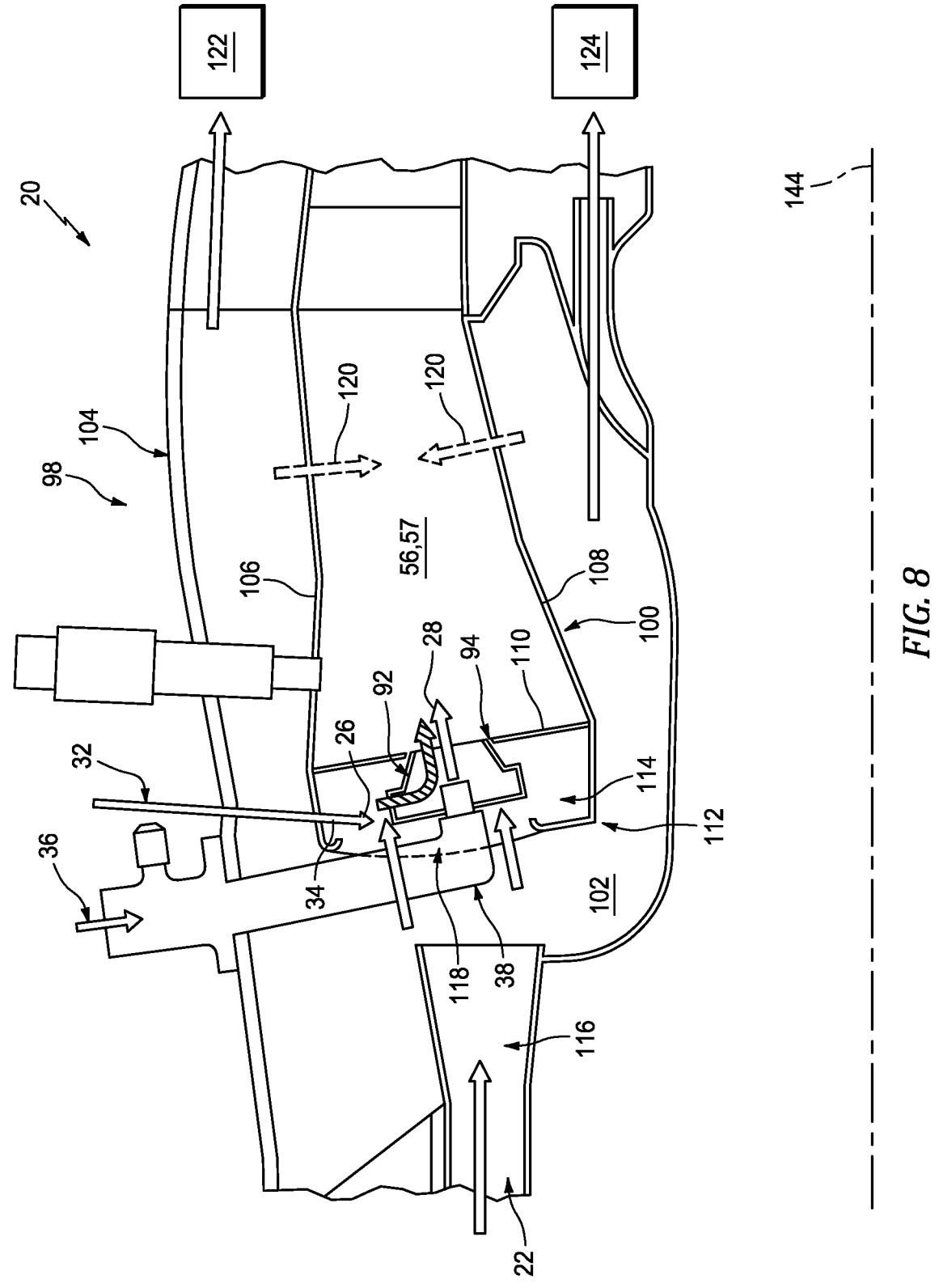
FIGS. 8-12 are schematic side sectional illustrations of a combustor section configured with various different fuel injection systems.

FIG. 8 is a schematic, sectional illustration of a portion of the combustor section 98 of the turbine engine. This combustor section 98 includes a (e.g., annular) combustor 100 arranged within the (e.g., annular) diffuser plenum 102 of a diffuser structure 104.

The combustor 100 includes a (e.g., tubular) combustor outer wall 106, a (e.g., tubular) combustor inner wall 108 and a (e.g., annular) combustor bulkhead 110. These combustor elements collectively form the (e.g., annular) combustion chamber 57. More particularly, the combustion chamber 57 extends radially between and to the combustor walls 106 and 108. The combustion chamber 57 extends axially (in an aft/downstream direction) along the combustor outer wall 106 and the combustor inner 108 from the combustor bulkhead 110.

The combustor 100 of FIG. 8 also includes a (e.g., annular) combustor cowl 112. This combustor cowl 112 is connected to the combustor bulkhead 110 and/or the combustor walls 106 and 108. The combustor cowl 112 and the combustor bulkhead 110 may collectively form the cowl plenum 114 therebetween. The cowl plenum 114 of FIG. 8, for example, extends axially between and to an axial end of the combustor cowl 112 and the combustor bulkhead 110. The cowl plenum 114 extends radially between opposing radial inner and outer sides of the combustor cowl 112.

The combustion chamber 57 may receive (e.g., compressed) air from the compressor section of the turbine engine through the diffuser plenum 102. For example, the air compressed by the compressor section may flow into the diffuser plenum 102 via the pre-diffuser passage 116. The air within the diffuser plenum 102 may flow into the cowl plenum 114 via one or more inlets 118 (one visible in FIG. 8) in the combustor cowl 112. The air within the cowl plenum 114 may flow into the combustion chamber 57 through one or more of the swirlers 92. Note, each air swirler 92 or a select subset of the swirlers 92 may be associated with a respective one of the second fuel injectors 38. The air flowing from the cowl plenum 114 and the swirlers 92 may account for a majority of/substantially all of the air (e.g., besides cooling air) entering the combustion chamber 57 where, for example, the combustor 100 is configured as a fuel-lean combustor. Alternatively, one or more of the combustor walls 106 and 108 may each include one or more quench apertures for admitting additional quench air 120 from the diffuser plenum 102 into the combustion chamber 57 where, for example, the combustor 100 is configured as a fuel-rich (rich-quench-lean (RQL)) combustor.

In some embodiments, one or more of the first fuel injectors 34 may be configured to direct the first fuel 26 into the cowl plenum 114. The first fuel 26 may thereby mix with the (e.g., compressed) air that enters the combustion chamber 57 through the air swirler(s) 92 prior to flowing through the swirler(s) 92. By mixing the first fuel 26 with the air upstream of the swirlers 92/inlets 94, the amount of fuel that is mixed downstream of the swirlers 92 (and/or other flow obstacles/impediments) may be reduced. This reduction of downstream fuel injection (e.g., fuel injected directly into the combustion chamber 57) may facilitate a more rapid and/or complete mixing of the (e.g., compressed) air and the fuel prior to combustion.

In some embodiments, one or more other components 122 and 124 of the turbine engine may also receive the air from the diffuser plenum 102, for example, for cooling those component 122 and 124. Examples of the components 122 and 124 include, but are not limited to, one or more arrays of turbine vanes, one or more arrays of turbine rotor blades, one or more blade outer air seals (BOAS), etc. By directing the first fuel 26 into the flowpath 22 within the cowl plenum 114, the first fuel 26 may flow directly into the combustion chamber 57 via the swirlers 92. Thus, the quench apertures (if included) and/or the air cooled components 122 and 124 may receive substantially or completely pure air for cooling.

Figure 9:
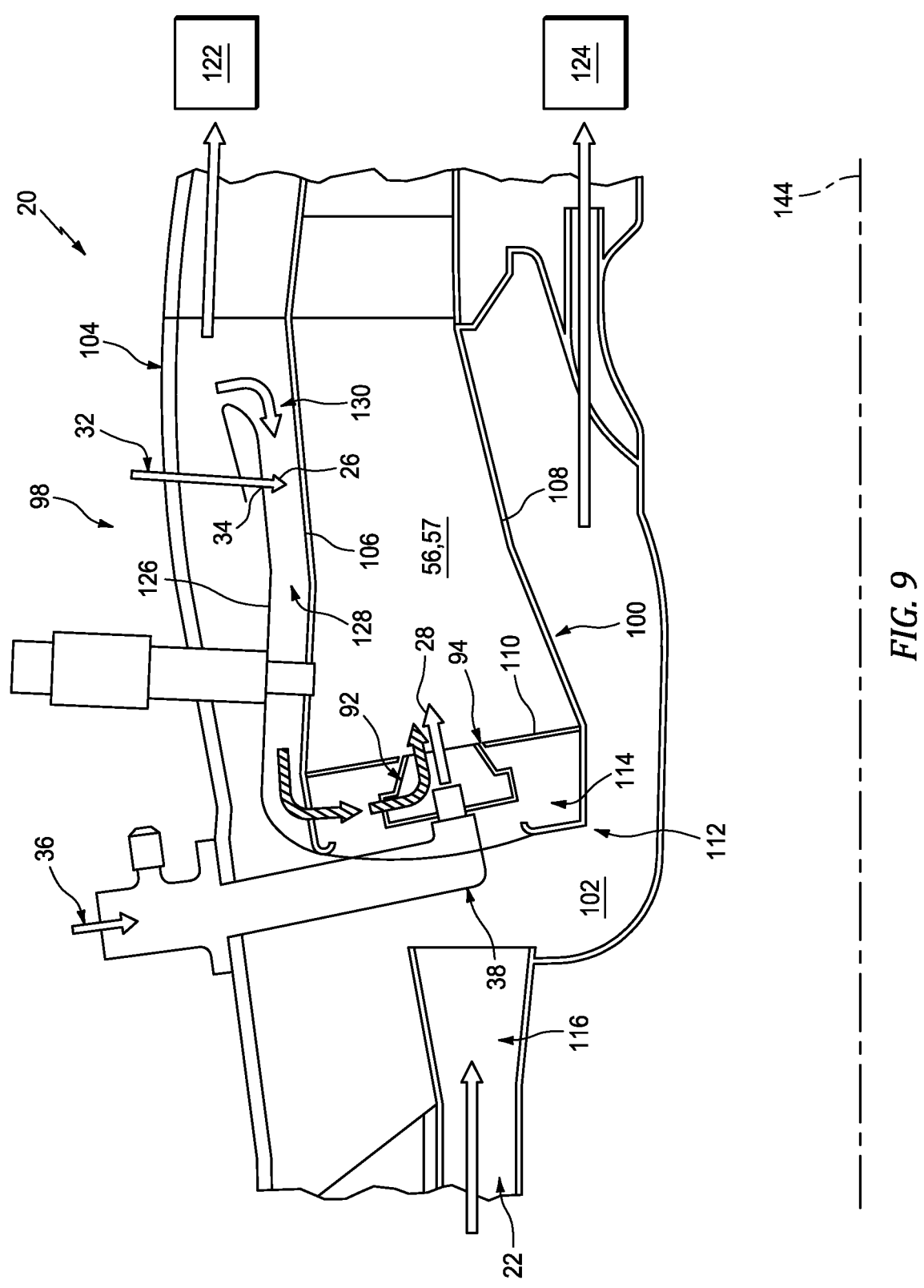

In some embodiments, referring to FIG. 9, the combustor 100 may be configured with/include a (e.g., tubular) convector wall 126. This convector wall 126 is configured to form a (e.g., annular) flow passage 128 with the combustor 100. A forward/upstream end of the convector wall 126 of FIG. 9, for example, is connected to the outer side of the combustor cowl 112. The convector wall 126 is spaced inward from an outer wall of the diffuser structure 104 such that the diffuser plenum 102 is formed radially between the wall 126 and the diffuser structure 104. The convector wall 126 is spaced radially out from and extends axially along the combustor outer wall 106 to a distal end. An inlet 130 to the passage 128 is formed between the convector wall 126 and the combustor outer wall 106 at the distal end of the convector wall 126. With this arrangement, the passage 128 may flow the air along the combustor outer wall 106 before entering the cowl plenum 114. Note, the inlets 118 to the cowl plenum 114 (see FIG. 8) may be omitted such that (e.g., substantially) all of the air entering the cowl plenum 114 and, thus, the combustion chamber 57 through the swirlers 92 first enters the passage 128 through its passage inlet 130.

In some embodiments, one or more of the first fuel injectors 34 may be configured to direct the first fuel 26 into the passage 128 at (e.g., on, adjacent or proximate) the passage inlet 130. Directing the first fuel 26 into the passage 128 provides additional time and space for the first fuel 26 to mix with the air prior to entering the combustion chamber 57. The fuel-air mixture may also provide convective cooling for the combustor outer wall 106. Again, with this embodiment, the quench apertures (if included) and/or the air cooled components 122 and 124 may receive substantially or completely pure air for cooling.

Figure 10:
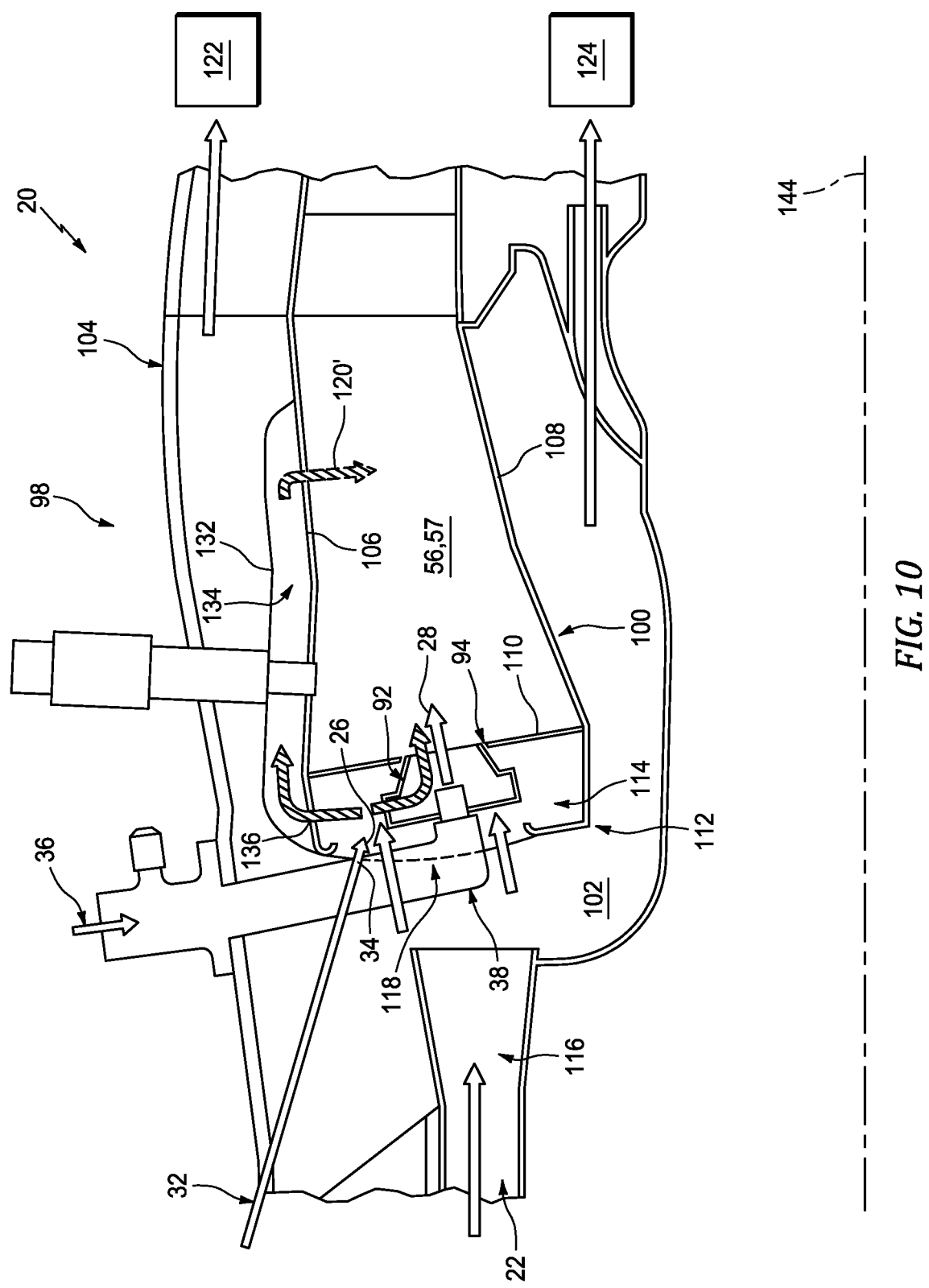
Figure 11:
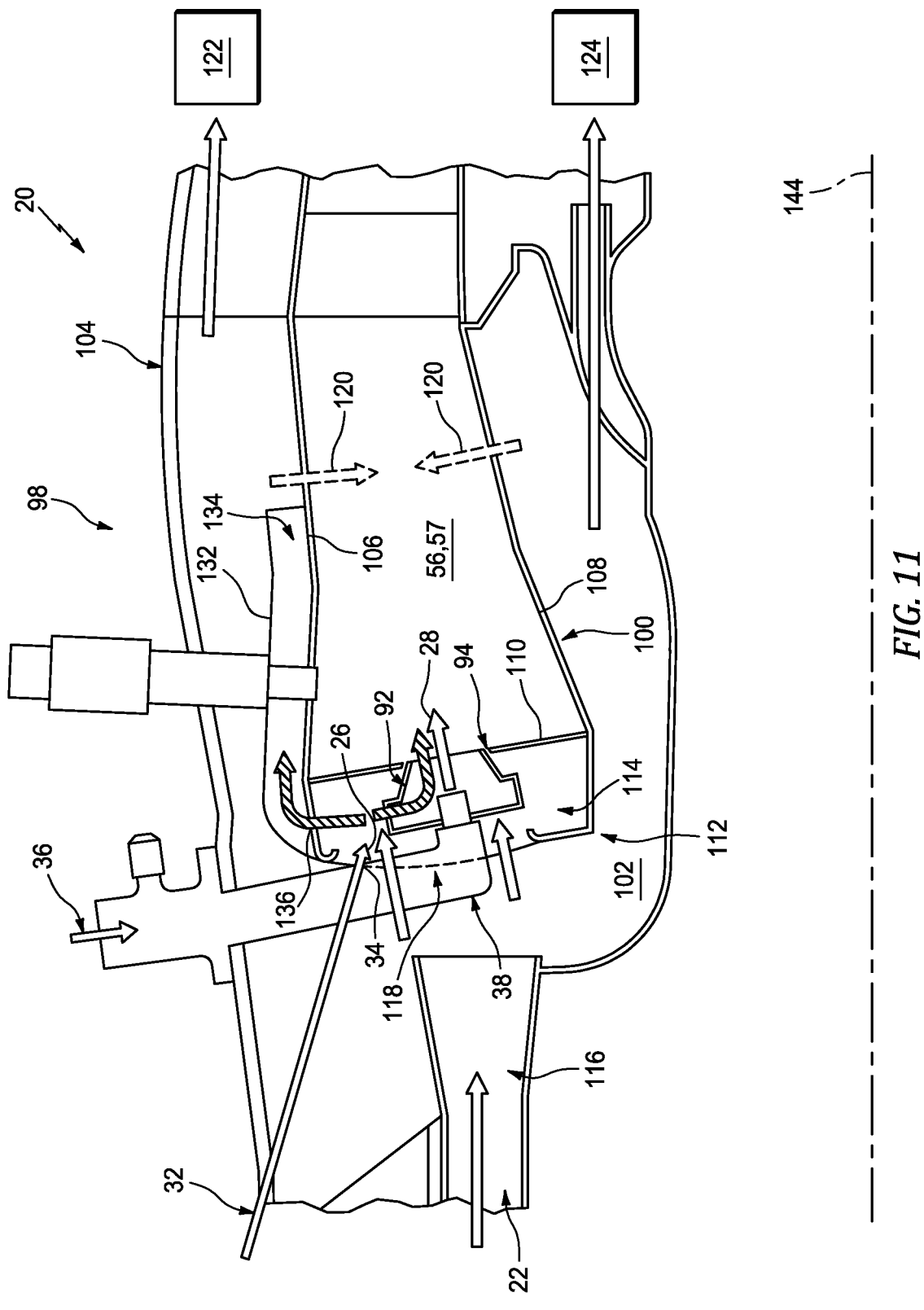

In some embodiments, referring to FIG. 10, the combustor 100 may be configured with/include a (e.g., tubular) convector wall 132. This convector wall 132 is configured to form a (e.g., annular) flow passage 134 with the combustor 100. A forward/upstream end of the convector wall 132 of FIG. 10, for example, is connected to the outer side of the combustor cowl 112. The convector wall 132 is spaced inward from the outer wall of the diffuser structure 104 such that the diffuser plenum 102 is formed radially between the convector wall 132 and the diffuser structure 104. The convector wall 132 is spaced radially out from and extends axially along the combustor outer wall 106 to a distal end. This distal end is connected to the combustor outer wall 106 at (e.g., on, adjacent or proximate) an aft, downstream end of the combustor outer wall 106; e.g., axially aft of the quench apertures if included. Alternatively, referring to FIG. 11, the distal end of the convector wall 132 may be connected to the combustor outer wall 106 at an axial intermediate point (e.g., midpoint) along the combustor 100; e.g., axially forward of the quench apertures if included. The passage 134 may be fluidly coupled with the cowl plenum 114 via, for example, one or more apertures 136 in the outer side of the combustor cowl 112. In addition, the inlets 118 to the cowl plenum 114 are included such that air may enter the cowl plenum 114 from the diffuser plenum 102. With this arrangement, the passage 134 may flow the air along the combustor outer wall 106 before entering the combustion chamber 57 via, for example, cooling apertures (not visible in FIGS. 10 and 11) in the combustor outer wall 106 and/or the quench apertures (if included).

In some embodiments, one or more of the first fuel injectors 34 may be configured to direct the first fuel 26 into the cowl plenum 114 (and/or directly into the passage 134). Directing the first fuel 26 into the cowl plenum 114 and/or the passage 134 provides additional time and space for the first fuel 26 to mix with the air prior to entering the combustion chamber 57. In the embodiment of FIG. 10, fuel enriched quench air 120' (e.g., quench air mixed with the first fuel) may be directed into the combustion chamber 57 via the quench apertures in the combustor outer wall 106 (when included). The fuel-air mixture may also provide convective cooling for the combustor outer wall 106. Again, with this embodiment, the air cooled components 122 and 124 may receive substantially or completely pure air for cooling. The quench apertures of FIG. 11 (if included) may also receive substantially or completely pure air for cooling.

Figure 12:
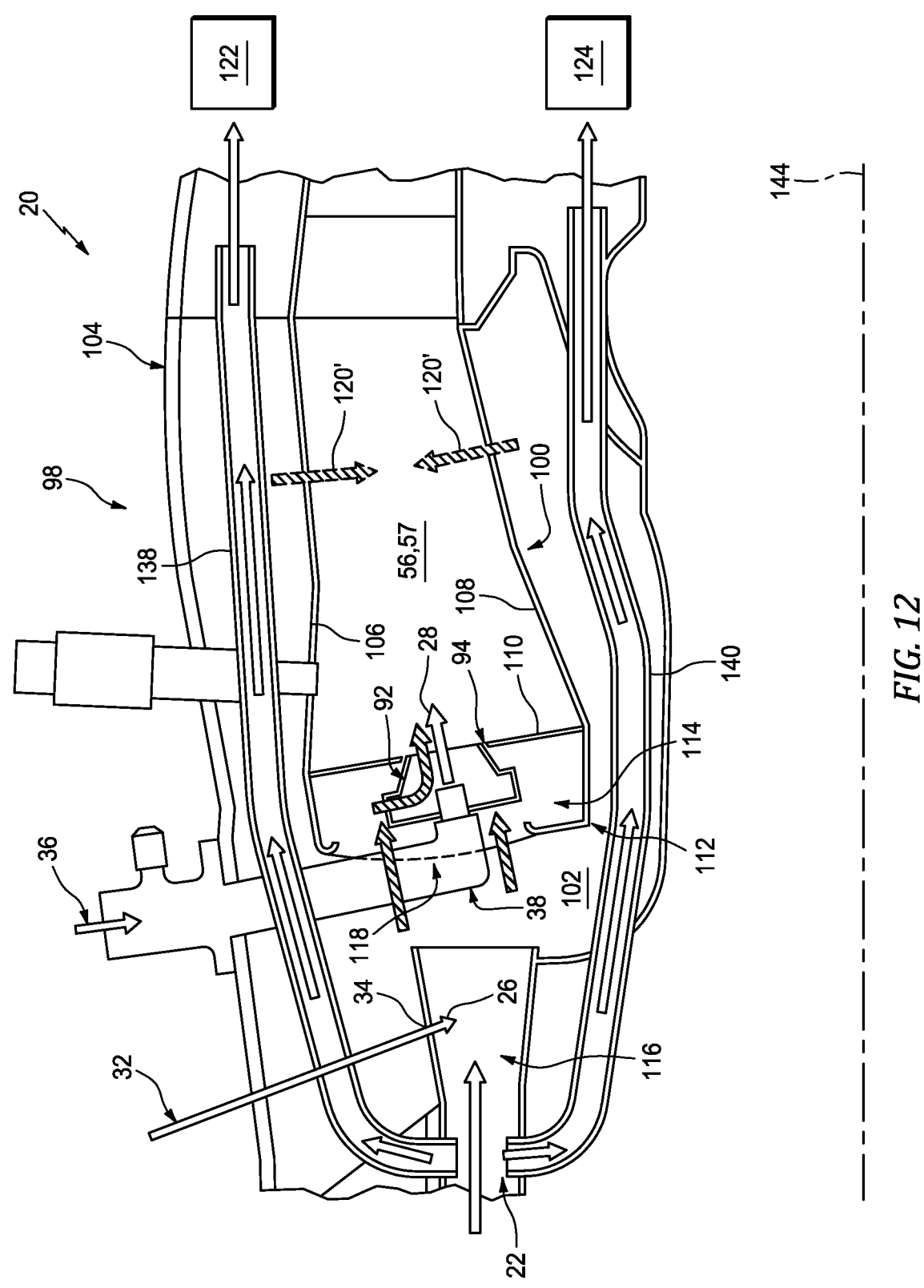

In some embodiments, referring to FIG. 12, one or more of the first fuel injectors 34 may be configured to direct the first fuel 26 into the pre-diffuser passage 116, or directly into the diffuser plenum 102. However, to prevent a mixture of the first fuel 26 and the air from flowing to the air cooled components 122 and 124, thereby ensuring that all fuel may enter the combustor 100, the turbine engine assembly 20 may include one or more air conduits 138 and 140. Each first (e.g., outer) air conduit 138 may tap the air from the flowpath 22, upstream of the first fuel injectors 34. Each first air conduit 138 may direct the tapped air to one or more respective air cooled components 122 and 124. Similarly, each second (e.g., inner) air conduit 140 may tap the air from the flowpath 22, upstream of the first fuel injectors 34. Each second air conduit 140 may direct the tapped air to one or more respective air cooled components 122 and 124.

In some embodiments, one or more of the second fuel injectors 38 of FIGS. 8-12 may be reconfigured to direct (e.g., inject) the second fuel 28 into the flowpath 22 (e.g., the combustion chamber 57) with one or more additives; e.g., diluents. Examples of the additives may include, but are not limited to, water, steam, methane, natural gas, kerosene, jet fuel, gasoline, diesel, another petroleum or distillate fuel, another hydrocarbon fuel such as biofuel or sustainable aviation fuel (SAF), or mixture of one or more of the foregoing additives. In still other embodiments, one or more of the second fuel injectors 38 may be reconfigured to direct (e.g., inject) one or more of the foregoing additives as the second fuel 28 without, for example, a portion derived from the fuel supply; e.g., $H_2$, $N_2$ and/or $NH_3$. More particularly, in other embodiments, one or more of the second fuel injectors 38 may be fluidly coupled with a fuel source (e.g., reservoir) other than the fuel source 30 (e.g., see FIG. 1).

Figure 13:
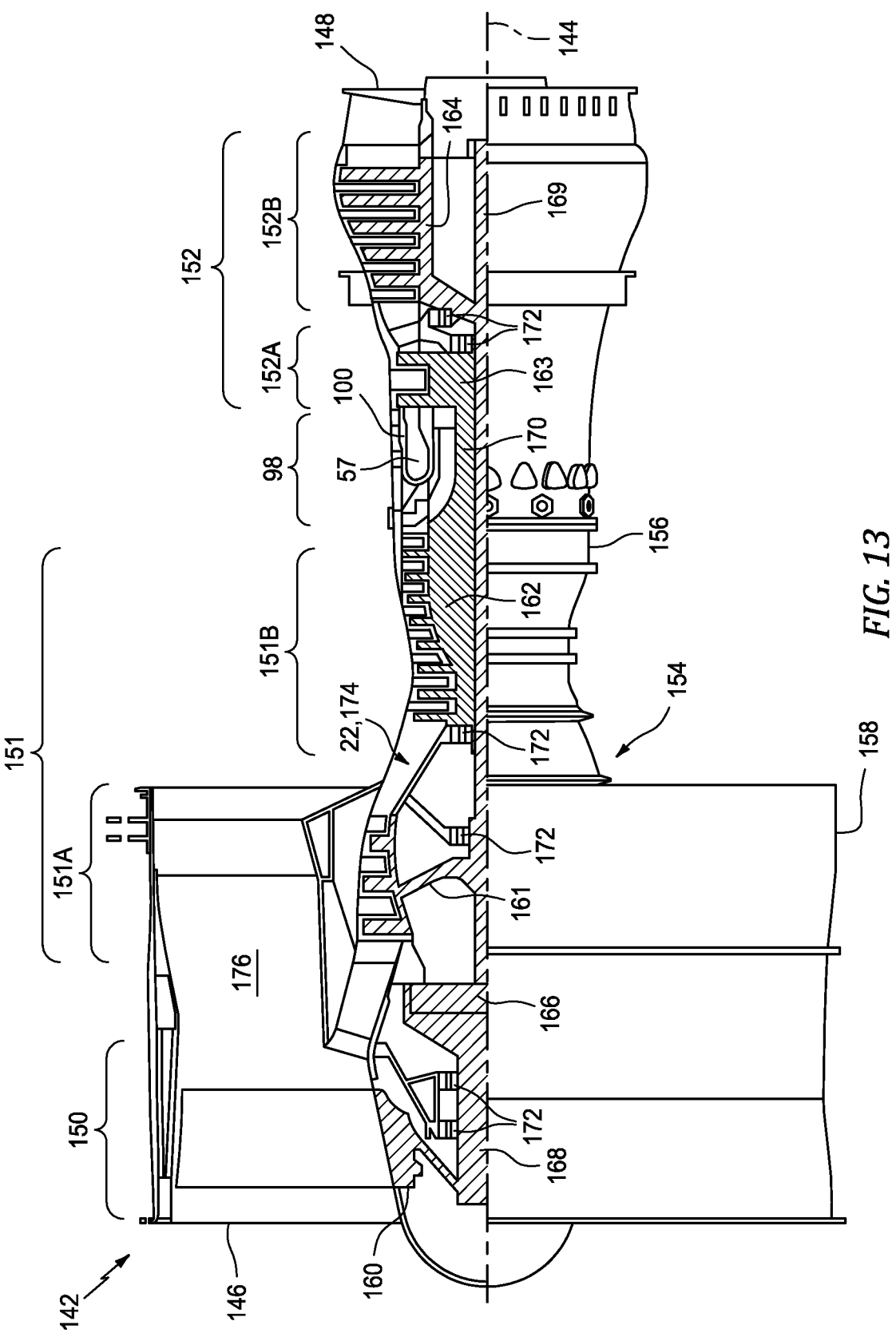
FIG. 13 is a side cutaway illustration of a geared turbofan gas turbine engine with which the turbine engine assembly may be configured.

FIG. 13 a side cutaway illustration of a geared turbine engine 142 with which the turbine engine assemblies 20 described above can be included. This turbine engine 142 extends along the axial centerline 144 between an upstream airflow inlet 146 and a downstream airflow exhaust 148. The turbine engine 142 includes the fan section 150, the compressor section 151, the combustor section 98 and the turbine section 152. The compressor section 151 includes a low pressure compressor (LPC) section 151A and a high pressure compressor (HPC) section 151B. The turbine section 152 includes a high pressure turbine (HPT) section 152A and a low pressure turbine (LPT) section 152B.

The engine sections 150, 151A, 151B, 98, 152A and 152B are arranged sequentially along the centerline 144 within an engine housing 154. This engine housing 154 includes an inner case 156 (e.g., a core case) and an outer case 158 (e.g., a fan case). The inner case 156 may house one or more of the engine sections 151A, 151B, 98, 152A and 152B; e.g., an engine core. The outer case 158 may house at least the fan section 150.

Each of the engine sections 150, 151A, 151B, 152A and 152B includes a respective rotor 160-164. Each of these rotors 160-164 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 160 is connected to a gear train 166, for example, through a fan shaft 168. The gear train 166 and the LPC rotor 161 are connected to and driven by the LPT rotor 164 through a low speed shaft 169. The HPC rotor 162 is connected to and driven by the HPT rotor 163 through a high speed shaft 170. The shafts 168-170 are rotatably supported by a plurality of bearings 172; e.g., rolling element and/or thrust bearings. Each of these bearings 172 is connected to the engine housing 154 by at least one stationary structure such as, for example, an annular support strut.

During operation, air enters the turbine engine 142 through the airflow inlet 146. This air is directed through the fan section 150 and into the core flowpath 174 (e.g., the flowpath 22) and a bypass flowpath 176. The core flowpath 174 extends sequentially through the engine sections 151A, 152B, 98, 152A and 152B. The air within the core flowpath 174 may be referred to as "core air". The bypass flowpath 176 extends through a bypass duct, which bypasses the engine core. The air within the bypass flowpath 176 may be referred to as "bypass air".

The core air is compressed by the compressor rotors 161 and 162 and directed into the combustion chamber 57 in the combustor section 98. The fuel (e.g., the combination of the $NH_3$ gas, the $H_2$ gas, the $N_2$ gas, etc.) is injected into the core flowpath 174 (e.g., the flowpath 22) as described above and mixed with the compressed core air to provide a fuel-air mixture. This fuel air mixture is ignited within the combustion chamber 57 and combustion products thereof flow through and sequentially cause the turbine rotors 163 and 164 to rotate. The rotation of the turbine rotors 163 and 164 respectively drive rotation of the compressor rotors 162 and 161 and, thus, compression of the air received from a core airflow inlet. The rotation of the turbine rotor 164 also drives rotation of the fan rotor 160, which propels bypass air through and out of the bypass flowpath 176. The propulsion of the bypass air may account for a majority of thrust generated by the turbine engine 142 of FIG. 13, e.g., more than seventy-five percent (75%) of engine thrust. The turbine engine of the present disclosure, however, is not limited to the foregoing exemplary thrust ratio.

The turbine engine assembly 20 may be included in various turbine engines other than the one described above.

The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train. The turbine engine assembly 20 may be included in a geared or non-geared turbine engine configured with a single spool, with two spools (e.g., see FIG. 13), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine with a flowpath, comprising:

a combustor comprising a tubular inner wall, a tubular outer wall, an annular bulkhead, an annular cowl, a combustion chamber and a cowl plenum, the annular bulkhead axially between and separating the combustion chamber and the cowl plenum, the combustion chamber extending radially between the tubular inner wall and the tubular outer wall, the cowl plenum extending radially between opposing inner and outer sides of the annular cowl;

a swirler including a plurality of vanes located at an inlet into the combustion chamber, the plurality of vanes of the swirler arranged fluidly between the cowl plenum and the combustion chamber along the flowpath;

a fuel injection system including a first fuel injector and a second fuel injector;

the fuel injection system configured to provide the first fuel injector with first fuel and provide the second fuel injector with second fuel, the second fuel different than the first fuel, and the second fuel consisting essentially of hydrogen gas;

the first fuel injector configured to direct the first fuel into the cowl plenum upstream of the plurality of vanes of the swirler for subsequent combustion in the combustion chamber; and the second fuel injector configured to direct the second fuel into the flowpath at the inlet into the combustion chamber downstream of the plurality of vanes of the swirler for subsequent combustion in the combustion chamber.

2. The assembly of claim 1, wherein the first fuel injector is configured to direct a first mass flow of the first fuel into the flowpath;

the second fuel injector is configured to direct a second mass flow of the second fuel into the flowpath; and the second mass flow of the second fuel is less than the first mass flow of the first fuel.

3. The assembly of claim 1, wherein the first fuel injector is configured to direct the first fuel into the flowpath for combustion when the turbine engine is in a first mode of operation; and the second fuel injector is configured to direct the second fuel into the flowpath for combustion when the turbine engine is in a second mode of operation.

4. The assembly of claim 3, wherein the first fuel injector does not direct the first fuel into the flowpath when the turbine engine is in the second mode of operation.

5. The assembly of claim 3, wherein the second fuel injector is configured to direct the second fuel into the flowpath for combustion when the turbine engine is in the first mode of operation.

6. The assembly of claim 3, wherein the second fuel injector does not direct the second fuel into the flowpath when the turbine engine is in the first mode of operation.

7. The assembly of claim 1, wherein at least a majority of the first fuel comprises ammonia.

8. The assembly of claim 1, wherein the fuel injection system further includes a fuel reservoir, a first fuel circuit and a second fuel circuit;

the first fuel circuit fluidly couples the fuel reservoir with the first fuel injector; and the second fuel circuit fluidly couples the fuel reservoir with the second fuel injector.

9. The assembly of claim 8, wherein the fuel reservoir is configured to provide supply fuel to the first fuel circuit and the second fuel circuit, and the supply fuel comprises ammonia;

the first fuel circuit is configured to flow the first fuel received from the fuel reservoir to the first fuel injector; and the second fuel circuit is configured to treat the supply fuel received from the fuel reservoir to provide the second fuel to the second fuel injector.

10. The assembly of claim 8, wherein the fuel reservoir is configured to provide supply fuel to the first fuel circuit and the second fuel circuit;

the first fuel circuit is configured to process the supply fuel received from the fuel reservoir to provide the first fuel to the first fuel injector; and the second fuel circuit is configured to process the supply fuel received from the fuel reservoir to provide the second fuel to the second fuel injector.

11. The assembly of claim 8, wherein the second fuel circuit includes a second fuel reservoir; and the second fuel reservoir is configured to contain a supply of the second fuel for provision to the second fuel injector.

12. The assembly of claim 1, wherein the fuel injection system further includes a first reservoir and a second reservoir;

the first reservoir is configured to contain at least the first fuel, and the first reservoir is upstream of and fluidly coupled with the first fuel injector; and the second reservoir is configured to contain the second fuel, and the second reservoir is upstream of and fluidly coupled with the second fuel injector.

* * * * *